(12) United States Patent
Matsushita

(10) Patent No.: US 11,701,934 B2
(45) Date of Patent: Jul. 18, 2023

(54) TOWING ASSIST DEVICE

(71) Applicant: Clarion Co., Ltd., Saitama (JP)

(72) Inventor: Yuki Matsushita, Saitama (JP)

(73) Assignee: CLARION CO., LTD., Saitama (JP)

( * ) Notice: Subject to any disclaimer, the term of this patent is extended or adjusted under 35 U.S.C. 154(b) by 238 days.

(21) Appl. No.: 17/116,586

(22) Filed: Dec. 9, 2020

(65) Prior Publication Data

US 2021/0206213 A1 Jul. 8, 2021

(30) Foreign Application Priority Data

Jan. 6, 2020 (JP) .................. 2020-000575

(51) Int. Cl.
| | |
|---|---|
| *B60D 1/36* | (2006.01) |
| *B60R 11/04* | (2006.01) |
| *B60R 1/00* | (2022.01) |
| *G06F 3/0488* | (2022.01) |
| *G06F 3/04845* | (2022.01) |
| *H04N 5/272* | (2006.01) |
| *B60R 11/00* | (2006.01) |

(52) U.S. Cl.
CPC ............... *B60D 1/36* (2013.01); *B60R 1/003* (2013.01); *B60R 11/04* (2013.01); *G06F 3/0488* (2013.01); *G06F 3/04845* (2013.01); *H04N 5/272* (2013.01); *B60R 2011/004* (2013.01)

(58) Field of Classification Search
CPC ...................................................... B60D 1/36
See application file for complete search history.

(56) References Cited

U.S. PATENT DOCUMENTS

| | | | |
|---|---|---|---|
| 2005/0049766 A1 | 3/2005 | Tanaka et al. | |
| 2006/0287800 A1 | 12/2006 | Watanabe et al. | |
| 2012/0185131 A1* | 7/2012 | Headley | B62D 15/027 701/41 |
| 2012/0271515 A1 | 10/2012 | Rhode et al. | |
| 2014/0324295 A1* | 10/2014 | Lavoie | B60W 50/14 701/41 |
| 2014/0379219 A1 | 12/2014 | Rhode et al. | |
| 2015/0149040 A1 | 5/2015 | Hueger et al. | |

(Continued)

FOREIGN PATENT DOCUMENTS

| | | |
|---|---|---|
| CN | 1591256 | 3/2005 |
| CN | 1881122 | 12/2006 |

(Continued)

*Primary Examiner* — Roland J Casillas
(74) *Attorney, Agent, or Firm* — Wenderoth, Lind & Ponack, L.L.P.

(57) ABSTRACT

A towing assist device includes an imaging device configured to capture a rear area from a towed vehicle when a towing vehicle moves backward, the towed vehicle being connected to the towing vehicle via a connector; a monitor device including a display screen configured to display a captured image which is captured by the imaging device, a touch screen function for detecting a touch position to the display screen; and a controller that is connected to the imaging device and the monitor device and is configured to control a display of the monitor device when the towing vehicle moves backward. The controller includes a display setting processing portion, a model display processing portion, a touch operation detection portion, and a movement direction model display processing portion.

14 Claims, 15 Drawing Sheets

(56) References Cited

U.S. PATENT DOCUMENTS

| | | | |
|---|---|---|---|
| 2015/0307129 A1 | 10/2015 | Headley | |
| 2016/0096549 A1 | 4/2016 | Herzog et al. | |
| 2018/0299885 A1 | 10/2018 | Herzog et al. | |
| 2019/0009817 A1* | 1/2019 | Bradley | B62D 15/021 |
| 2019/0071088 A1 | 3/2019 | Hu et al. | |
| 2019/0217888 A1 | 7/2019 | Perry | |
| 2019/0308663 A1 | 10/2019 | Rhode et al. | |
| 2020/0130744 A1* | 4/2020 | Niewiadomski | B62D 15/025 |
| 2021/0291901 A1 | 9/2021 | Rhode et al. | |

FOREIGN PATENT DOCUMENTS

| | | |
|---|---|---|
| CN | 102745193 | 10/2012 |
| CN | 104602991 | 5/2015 |
| CN | 106715245 | 5/2017 |
| CN | 108698641 | 10/2018 |
| CN | 109421453 | 3/2019 |
| JP | 2014-502582 | 2/2014 |

\* cited by examiner

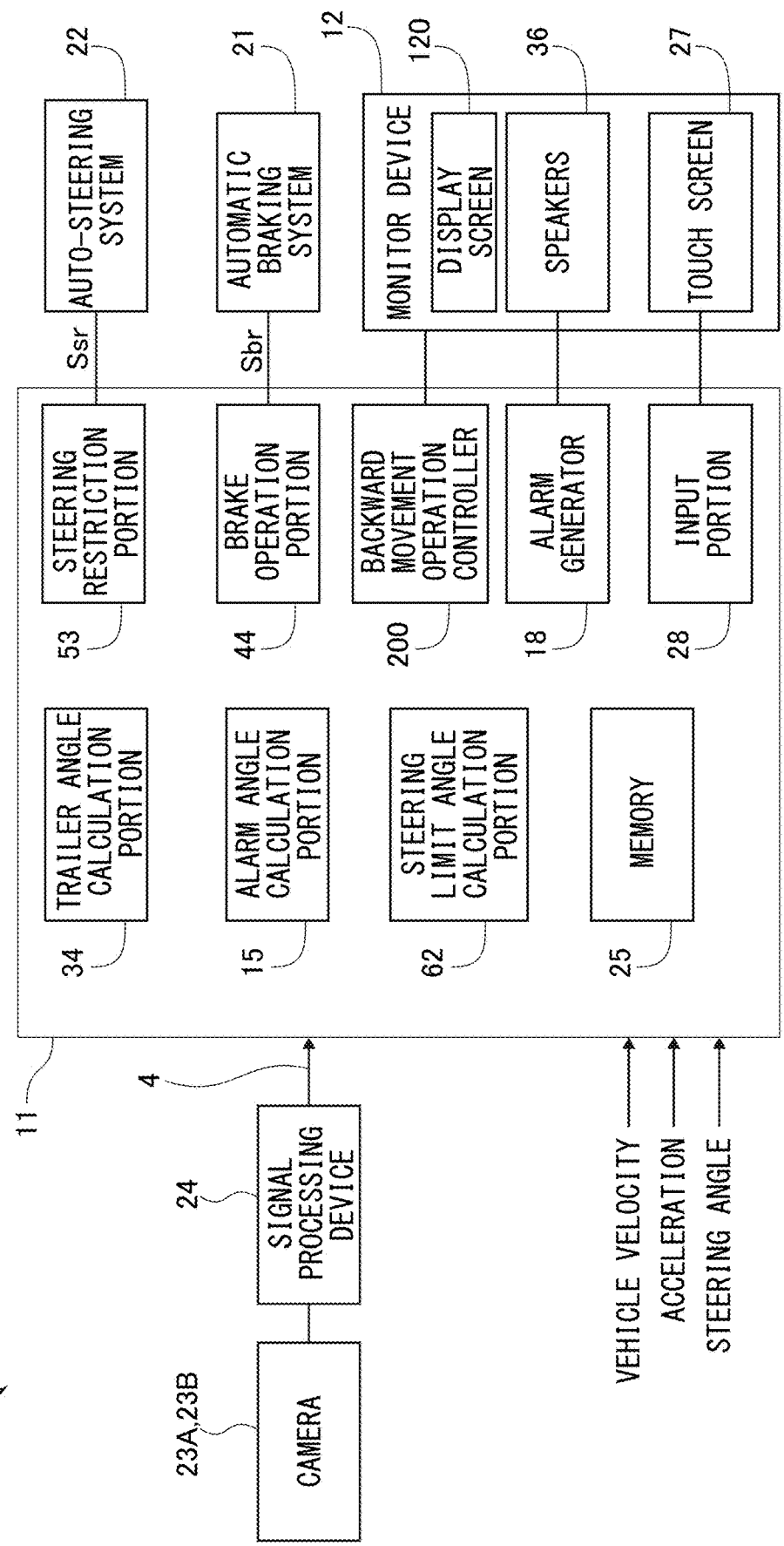

FIG.9
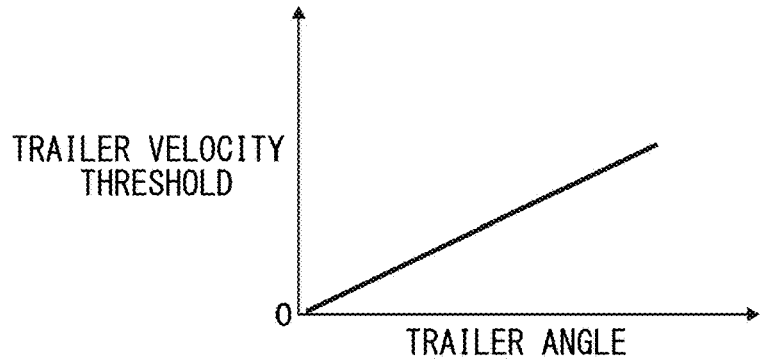
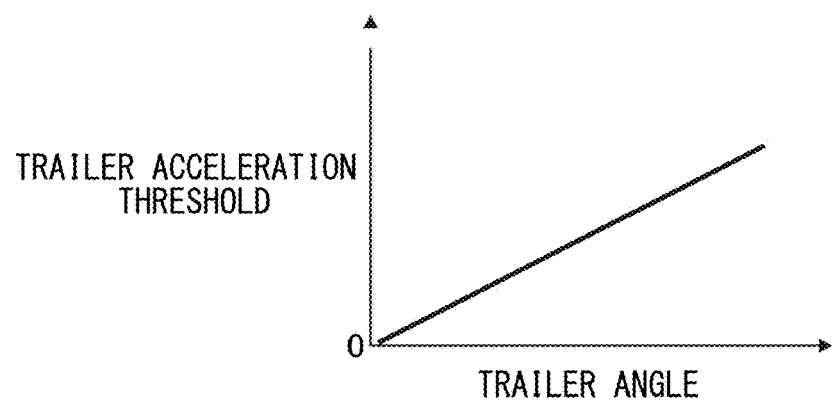
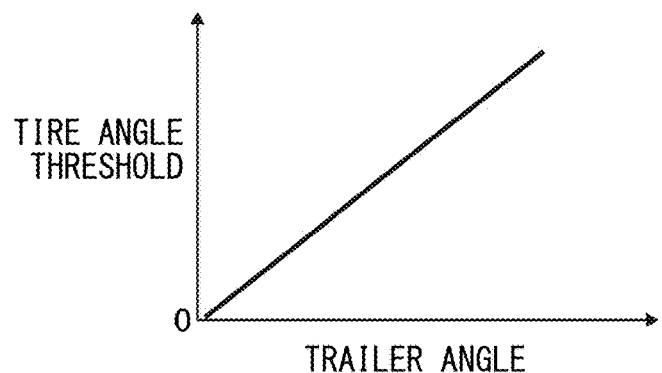
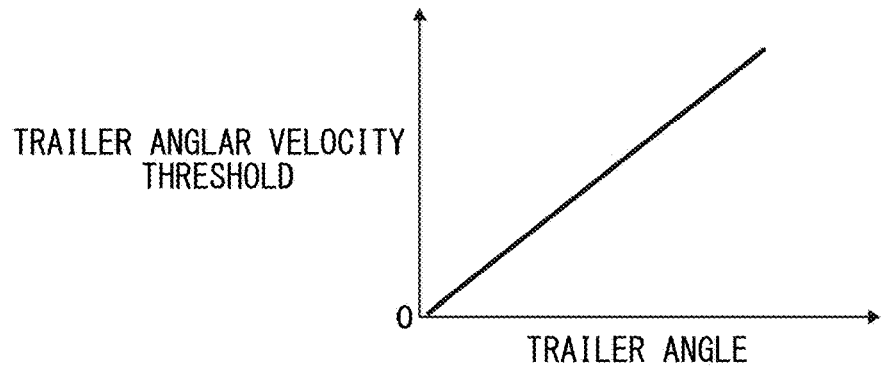

TIME t1

TIME t2

TOWING ASSIST DEVICE

CROSS-REFERENCE TO RELATED APPLICATION

The present application is based on and claims priority from Japanese Patent Application No. 2020-000575 filed on Jan. 6, 2020, the disclosure of which is hereby incorporated by reference in its entirety.

FIELD OF THE INVENTION

The present disclosure relates to a towing assist device.

BACKGROUND

A towing assist device or system for a vehicle such as an automobile to which a towed vehicle such as a trailer is connected is known in the art. The towed vehicle is connected to the vehicle via a connector that is attached to the rear portion of the vehicle. Such a system performs the towing assistance such as the adjustment of a steering angle when the vehicle tows the towed vehicle and moves backward (see JP 2014-502582A, for example).

JP 2014-502582A discloses a system and a method for maneuvering a vehicle-trailer unit in reverse travel in which at least one sensor (12L, 12R) is used to generate output information representative of the relative position between the front of the trailer and the rear of the vehicle. An electronic processing unit (22) compares the measured amount with the reference value and determines whether the trailer is deviated from the linear alignment with the vehicle from the comparison result. When the trailer (20) is not linearly aligned with the vehicle (10), the system interferes with at least one of the steering system (28) of the vehicle and the braking system of the trailer. The sensor is a distance sensor or a camera and the amount to be measured is the distance or the position of markers. The method uses stored values, previously measured values, or simultaneously measured values as the reference values for the comparison. The method is performed automatically or with a switch pressed by the driver of the vehicle.

When the towing vehicle moves backward, the left-right movement direction of the towed vehicle with respect to the towing vehicle is opposite to the steering direction of the towing vehicle. For example, when the driver steers the towing vehicle in the right direction while the vehicle is moving backward, the rear portion of the towing vehicle that is located forward of the connection point moves in the right direction with respect to the connection point and the towed vehicle moves in the left direction with respect to the connection point. If the driver wants to move the towed vehicle in the left direction of the towing vehicle (i.e. target direction) while the vehicle is moving backward, the driver first steers the towing vehicle to the right direction opposite to the target direction so that the rear portion of the towed vehicle faces the target direction. Then, the driver returns the steering direction to the neutral position so that the direction of the towing vehicle is the same as that of the towed vehicle.

In addition, the left-right movement direction of the towed vehicle with respect to the towing vehicle and the left-right movement direction of the towed vehicle on the display screen of the monitor are reversed when the vehicle moves backward. For example, the operator such as the driver slides a slider in the left direction to input an instruction for the movement direction when the operator wants to move the towed vehicle in the left direction of the towing vehicle. At this time, a steering wheel is steered in the right direction in the early stage of the backward movement, so that the towed vehicle moves in the right direction on the screen of the monitor.

As describe above, the steering direction of the steering wheel and the movement direction of the towed vehicle on the screen of the monitor differ from the operation direction of the slider and the actual movement direction of the towed vehicle. As a result, it is difficult for the driver to grasp whether the towed vehicle is moving as instructed.

Accordingly, an object of the present disclosure is to provide a towing assist device that makes it easy for the driver to instruct the movement direction of the towed vehicle and to grasp the steering direction and the movement direction of the towed vehicle on a display screen of a monitor device when the vehicle moves backward.

SUMMARY

The towing assist device of the present disclosure includes an imaging device that is configured to capture a rear area from a towed vehicle when a towing vehicle moves backward, the towed vehicle being connected to the towing vehicle via a connector; a monitor device that includes a display screen to display a captured image by the imaging device, and a touch screen function that detects a touch position to the display screen; and a controller that is connected to the imaging device and the monitor device, the controller being configured to control a display of the monitor device when the towing vehicle moves backward.

The controller includes a display setting processing portion that is configured to set on the display screen a captured image display portion that displays the captured image and an operation image display portion that displays an operation image; a model display processing portion that is configured to display a vehicle model that represents the towing vehicle and a towed vehicle model that represents the towed vehicle on the operation image display portion; a touch operation detection portion that is configured to detect a touch operation that moves the towed vehicle model displayed on the operation image display portion of the display screen; and a movement direction model display processing portion that is configured to obtain a movement direction of the towed vehicle in accordance with a direction of a touch operation to the towed vehicle model, and to display on the captured image display portion the captured image and a movement direction display model that represents the movement direction of the towed vehicle on the captured image in accordance with the movement direction of the towed vehicle.

BRIEF DESCRIPTION OF DRAWINGS

FIG. 6 is a block diagram illustrating the entire towing assist device of the first embodiment.

FIG. 9 shows maps for obtaining gains of the formulas shown in FIG. 8; a first map is to obtain a trailer velocity threshold; a second map is to obtain a trailer acceleration threshold; a third map is to obtain the steered angle threshold; and a fourth map is to obtain a trailer angular velocity threshold.

DETAILED DESCRIPTION

Figure 1:
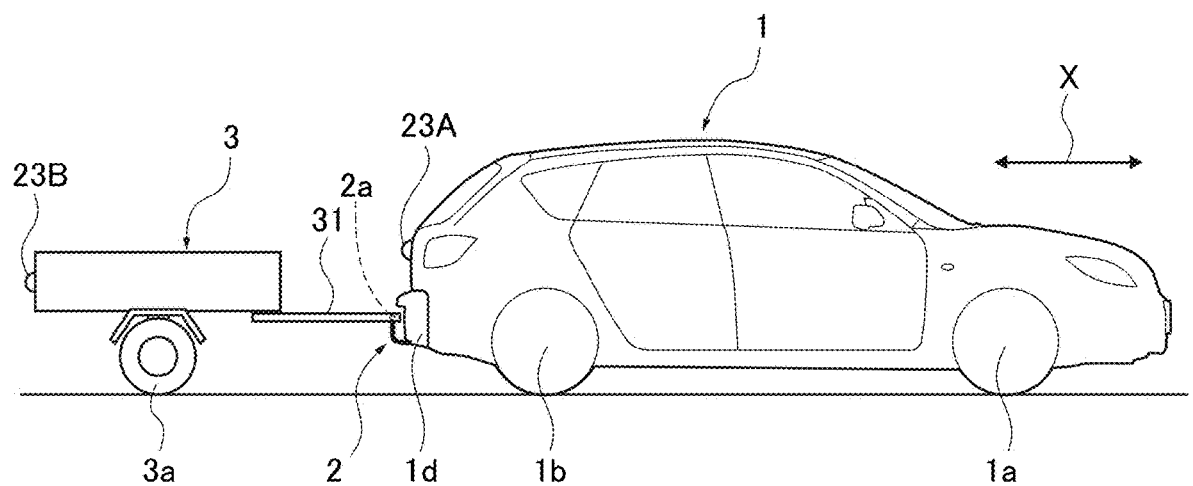
FIG. 1 is a side view illustrating a towing vehicle including a towing assist device of a first embodiment and a trailer connected to the towing vehicle.
Figure 2:
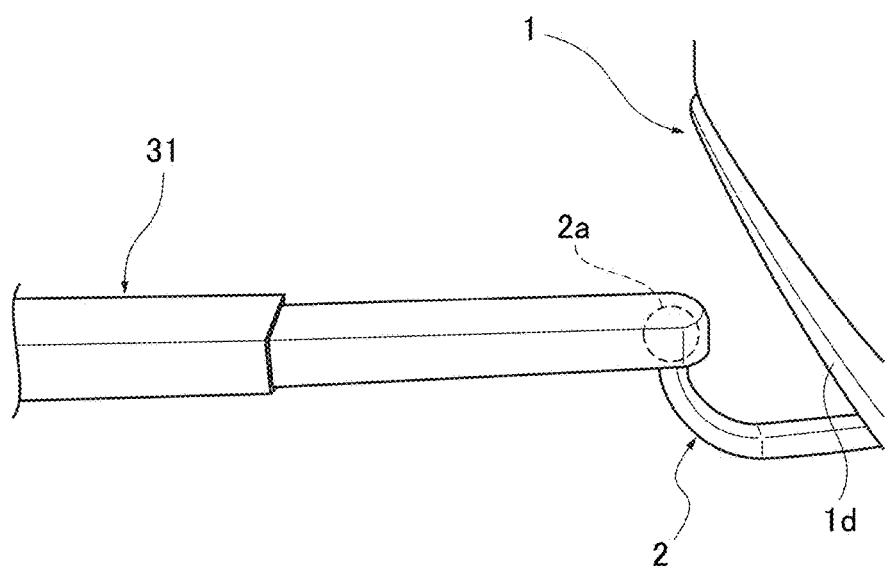
FIG. 2 is a perspective view illustrating a connector.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

Hereinafter, embodiments of the present disclosure will be described with reference to the figures. A towing assist device A in a first embodiment will be described. The towing assist device A in the first embodiment is mounted or installed in a towing vehicle 1 shown in FIG. 1. First, the towing vehicle 1 will be briefly described. The towing vehicle 1 includes a connector 2 in the rear portion thereof. A trailer 3, which is a towed vehicle, is connected to the towing vehicle 1 via the connector 2.

The towing vehicle 1 includes, in addition to a driving function by the driver, a function to assist or support driving or a function to automatically or autonomously drive the vehicle on behalf of the driver or the passenger (i.e. drive support vehicle, autonomous vehicle, or the like). Further, the towing vehicle 1 includes an automatic braking system 21 and an auto-steering system 22 shown in FIG. 6 for the drive assistance or the autonomous driving.

The automatic braking system 21 is configured to control the braking action of a braking device (not shown). The automatic braking system 21 controls the braking force based on inputs from an automatic operation control device and in-vehicle sensors (not shown). In addition, the automatic braking system 21 controls the braking force based on commands from a brake operation portion 44 of a controller 11 or the like during the backward movement assistance.

The auto-steering system 22 includes an actuator such as a motor for rotating a steering wheel and/or wheels (not shown). The auto-steering system 22 is configured to steer the wheels (front wheels 1a) in accordance with inputs from the automatic operation control device (not shown). Also, the auto-steering system 22 is configured to steer the wheels (i.e. to change the direction of the wheels) in accordance with commands from a steering restriction portion 53 of the controller 11 or the like during the backward movement assistance.

Returning to FIG. 1, the connector 2 is connected to a lower frame (not shown) of a rear bumper 1d in the center of the towing vehicle 1 in the vehicle width direction. The connector 2 extends rearward from the rear bumper 1d in the vehicle longitudinal direction. The connector 2 includes a spherical hitch ball 2a (connection point) at the tip thereof. A connecting member 31 connected to the trailer 3 includes a coupler at the tip thereof. The coupler receives the hitch ball 2a to connect the connecting member 31 to the connector 2. Thereby, the towing vehicle 1 and the trailer 3 are connected to each other so that the trailer 3 is rotatable about the hitch ball 2a. The rotation direction of the trailer 3 is in the left and right direction (i.e. vehicle width direction) with respect to the towing vehicle 1.

Figure 3:
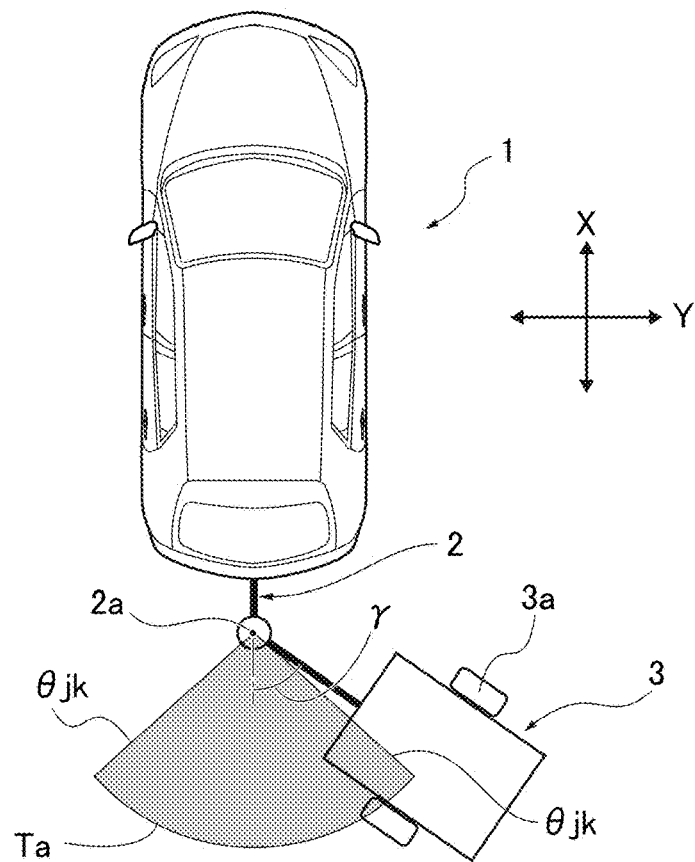
FIG. 3 is a plan view illustrating the towing vehicle and the trailer to explain a jackknife phenomenon and a trailer angle.

The behavior of the towing vehicle 1 to which the trailer 3 is connected differs from that of the normal towing vehicle 1. Accordingly, the driver needs to be experienced to driving such a towing vehicle. For example, the inertia of the trailer 3 during the acceleration and deceleration of the towing vehicle 1 causes a difference in speed between the trailer 3 and the towing vehicle 1 and changes the angle therebetween. This may cause a so-called jackknife phenomenon where the towing vehicle 1 and the trailer 3 connected each other are aligned in a L shape. Accordingly, the driver needs to be careful to avoid the jackknife phenomenon while driving. Particularly, it is difficult to move the towing vehicle 1 backward. For example, as shown in FIG. 3, when an angle between the towing vehicle 1 and the trailer 3 (hereinafter referred to as trailer angle γ) becomes larger than a certain angle and accordingly the jackknife phenomenon occurs, the trailer 3 becomes immobile.

The trailer angle γ is represented as a swing angle of the trailer 3 in the left and right direction (i.e. vehicle width direction Y) wherein the direction of the towing vehicle 1 in the vehicle longitudinal direction X sets to 0 degree. For example, the right side of the towing vehicle 1 may be represented as the positive (+) angle and the left side of the towing vehicle 1 may be represented as the negative (−) angle (positive (+) and negative (−) may be reversed). An area inside a sector shown in FIG. 3 is an area with an angle less than the jackknife angle θjk so that the jackknife phenomenon does not occur therewithin (i.e. allowable steering area Ta, which will be described below).

The towing assist device A in the first embodiment assists the driver to input an instruction for the backward movement via a monitor device 12 and prevents the towing vehicle 1 from generating the jackknife phenomenon when the vehicles move backward. Specifically, in the first embodiment, the driver performs at least a touch operation and the towing assist device A performs the backward movement assistance for steering and braking in response to the touch operation.

Figure 4:
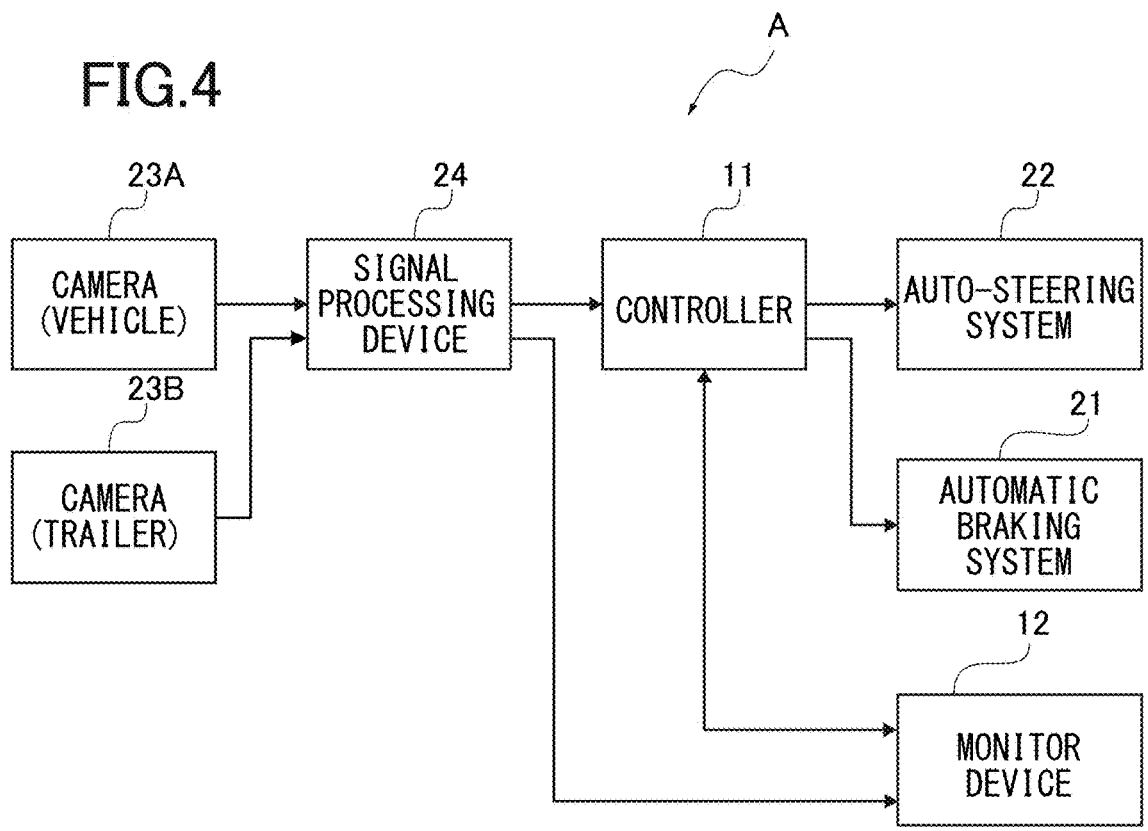
FIG. 4 is a schematic block diagram illustrating the towing assist device of the first embodiment.

As shown in FIG. 4, the towing assist device A includes a camera 23A, a camera 23B, a signal processing device 24, the controller 11, the monitor device 12, a part of the automatic braking system 21, and a part of the auto-steering system 22.

The camera 23A is mainly used upon controlling the towing vehicle 1. As shown in FIG. 1, the camera 23A is mounted on the rear portion of the towing vehicle 1 in a position where the trailer 3 and the connector 2 can be captured or photographed. In addition to the camera 23A, devices for detecting surrounding conditions of the trailer 3 such as a radar sensor (LIDAR), a millimeter-wave sensor (milliwave) may be provided. The camera 23B is disposed in the rear portion of the trailer 3 which is the towed vehicle. The camera 23B is configured to communicate with the controller 11 or the monitor device 12 by wired or wireless communication.

Returning to FIG. 4, the signal processing device 24 is configured to process signals from the cameras 23A and 23B and to provide the signals to the controller 11. The signal processing device 24 may be provided as an external structure of the controller 11 or as an internal function of the controller 11.

The monitor device 12 is disposed near the driver's seat (not shown) of the towing vehicle 1 in a position where the driver can operate the monitor device 12. The monitor device 12 may be provided exclusively for the towing assist device A. Alternatively, a monitor of other electronic devices (such as an instrument device including a monitor, a car navigation system, an in-vehicle TV, a drive recorder, a smartphone, a tablet terminal, for example) installed in the towing vehicle 1 may be used as the monitor device 12.

Figure 5A:
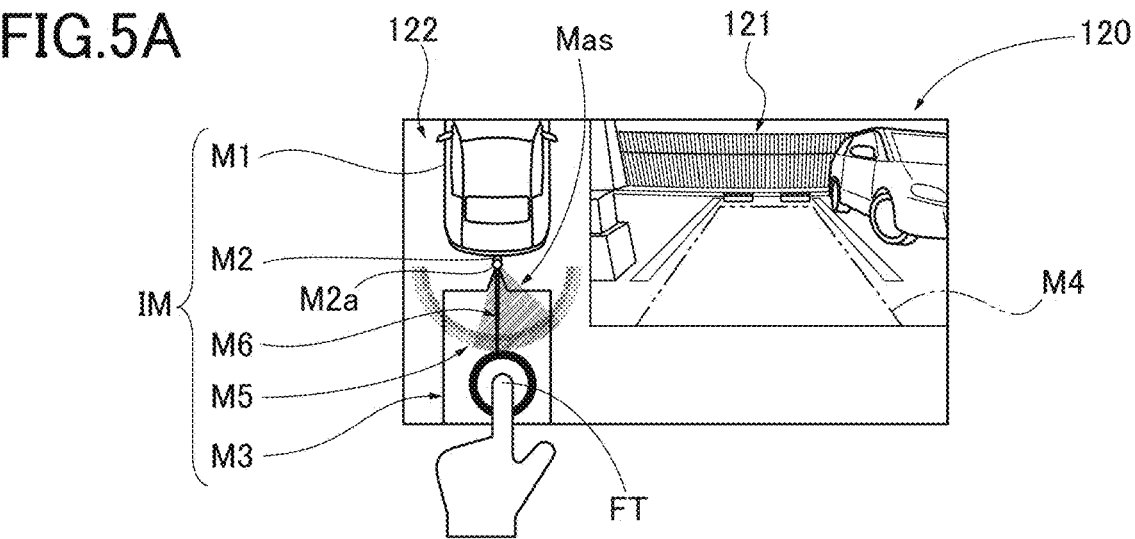
FIG. 5A is a schematic view illustrating an operation image displayed on an operation image display portion in the towing assist device of the first embodiment wherein the trailer angle of the trailer is 0 degree.
Figure 5B:
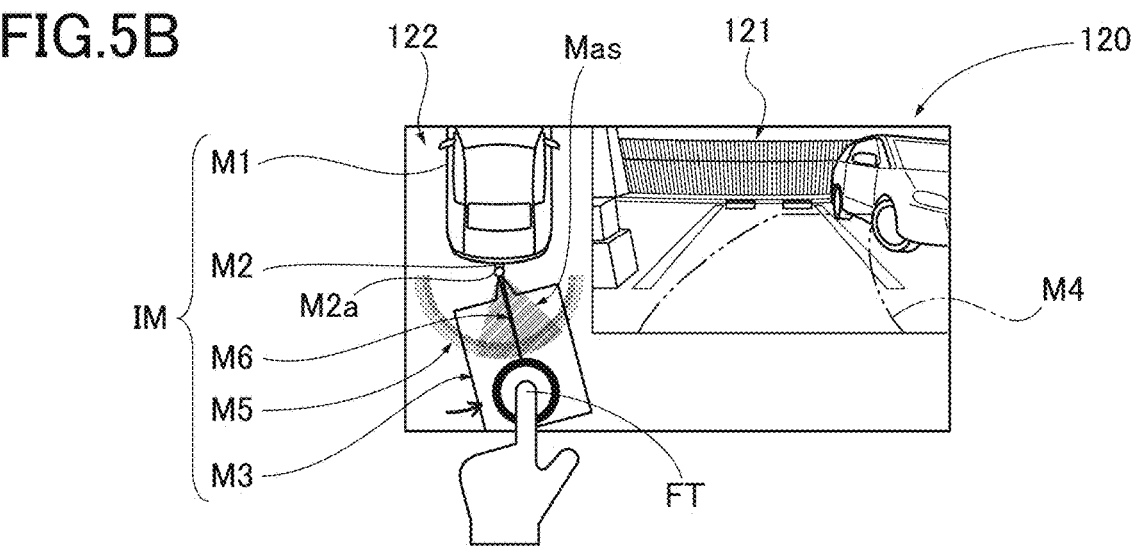
FIG. 5B is a schematic view illustrating the operation image displayed on the operation image display portion in the towing assist device of the first embodiment and a swipe operation wherein a trailer model is swept from the state shown in FIG. 5A in the right direction.
Figure 5C:
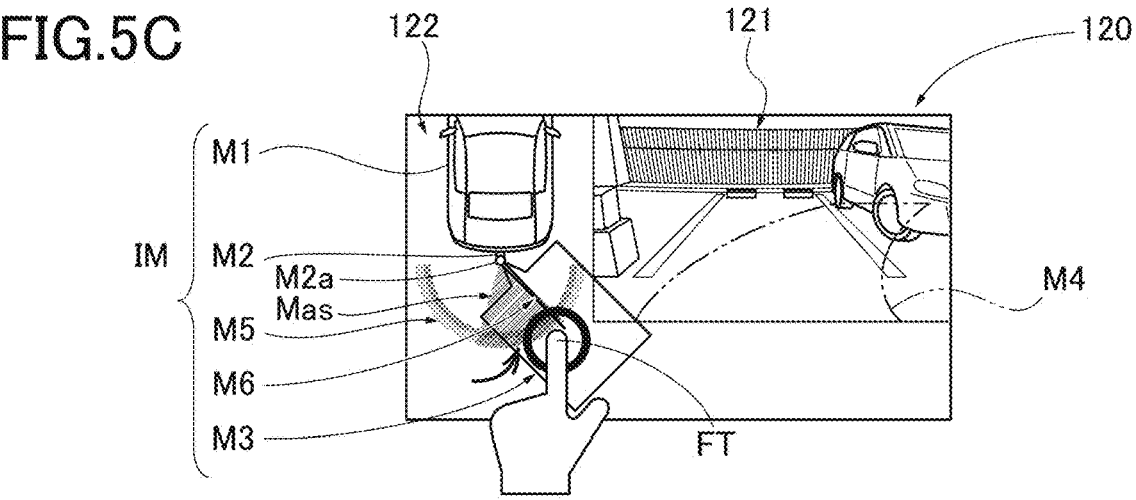
FIG. 5C is a schematic view illustrating the operation image displayed on the operation image display portion in the towing assist device of the first embodiment and the swipe operation wherein the trailer model is swept from the state shown in FIG. 5B in the right direction.

As shown in FIG. 6, the monitor device 12 includes a display screen 120, speakers 36, and a touch panel or touch screen 27. The display screen 120 includes a camera image display portion 121 as a captured image display portion and an operation image display portion 122. As shown in FIGS. 5A to 5C, the camera image display portion 121 of the display screen 120 displays an image or a moving image of the rearward area from the trailer 3 captured by the camera 23B when the backward movement of the towing vehicle 1 is operated. In addition, the monitor device 12 includes the touch screen 27. The touch screen 27 is configured to receive inputs regarding the towing assist control. The touch operation to the operation image display portion 122 of the display screen 120 is used as an input regarding the towing assist control when the towing vehicle 1 moves backward. This will be described in detail below.

The controller 11 is configured to assist inputs of the instruction to the backward movement direction when the towing vehicle 1 moves backward and also to assist the backward movement of the trailer 3 to a target position without the jackknife phenomenon. Hereinafter, the controller 11 will be described in detail.

The configuration of the controller 11 will be described. The controller 11 mainly consists of an arithmetic control device such as a computer installed in the towing vehicle 1 and a control software installed in the arithmetic control device. The controller 11 is configured to calculate an amount of control required to assist the backward movement of the trailer 3 and the towing vehicle 1.

As shown in FIG. 6, the controller 11 includes a trailer angle calculation portion 34, an alarm angle calculation portion 15, a steering limit angle calculation portion 62, a memory 25, the steering restriction portion 53, the brake operation portion 44, a superimposing display portion 17, an alarm generator 18, an input portion 28, and a backward movement operation controller 200.

Figure 8:
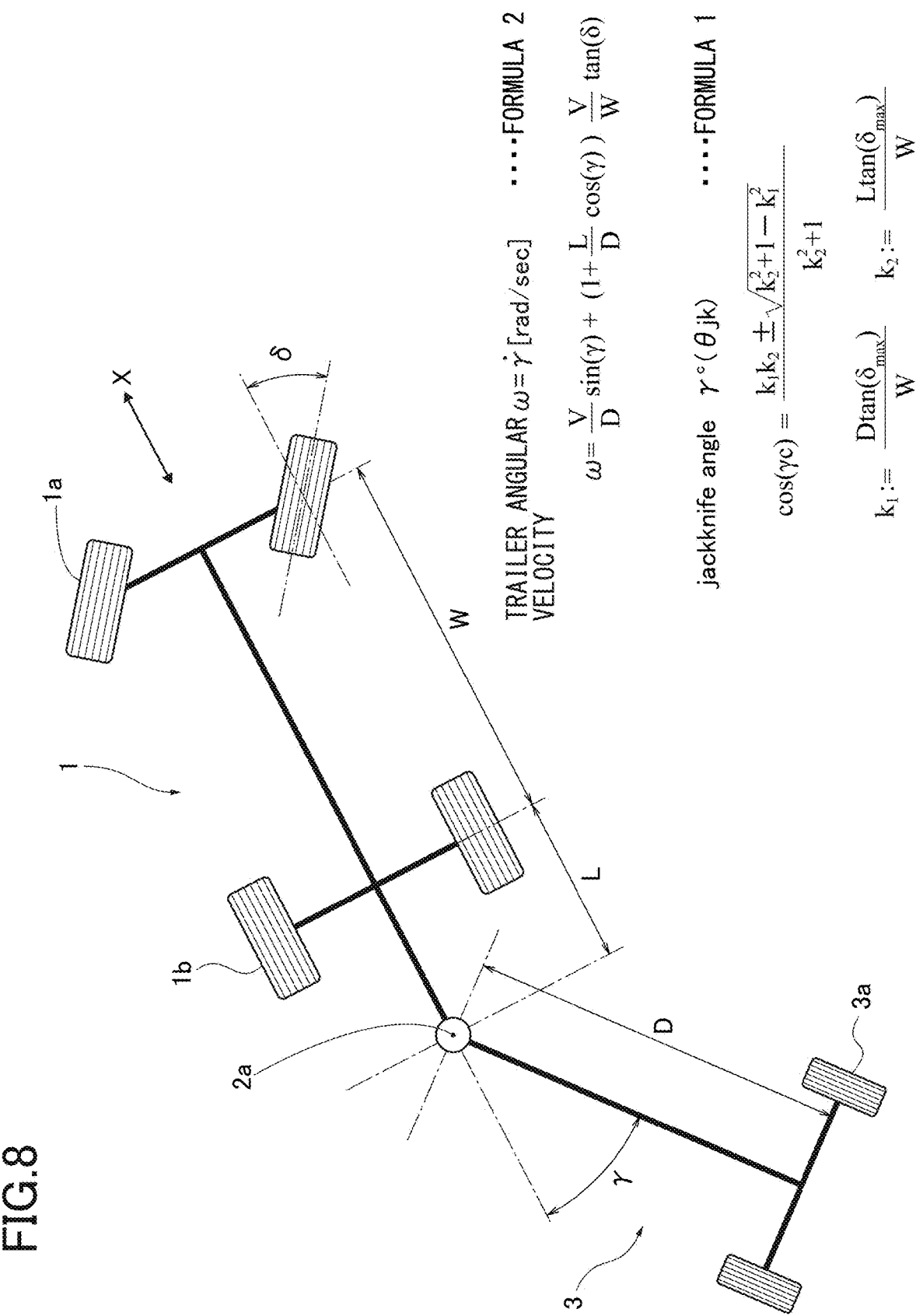
FIG. 8 is a plan view illustrating parameters of the towing vehicle and the trailer that are substituted into formulas to calculate the jackknife angle and the trailer angular velocity.

The trailer angle calculation portion 34 is configured to calculate the trailer angle γ by the image recognition processing, the data analysis processing or the like based on the input information from the camera 23A. As shown in FIG. 8, the trailer angle γ is a bend angle or swing angle between the towing vehicle 1 and the trailer 3. In other words, the trailer angle γ is an angle between a center line of the towing vehicle 1 in the vehicle width direction, which extends through the hitch ball 2a of the connector 2, and a center line of the trailer 3 in the vehicle width direction. The trailer angle γ changes from time to time. The trailer angle γ is calculated by the trailer angle calculation portion 34.

The trailer angle γ may also be calculated by integrating the trailer angular velocity ω with the elapsed time. The trailer angular velocity ω is the velocity of the rotational movement of the trailer 3 about the hitch ball 2a of the connector 2, and is a physical quantity that changes from time to time.

The trailer angular velocity ω is calculated by substituting parameters of a distance D, a distance W, and a distance L, vehicle velocity V, the steering angle δ, or the like into the corresponding formulas (e.g. Formula 2 shown in FIG. 8). In the corresponding formula, the distance D is a distance between the hitch ball 2a of the connector 2 (connection point) and (the center of) idler wheels 3a of the trailer 3. In the corresponding formulas, the distance W is a distance between (center of) the front wheels 1a of the towing vehicle 1 and (center of) the rear wheels 1b (i.e. wheelbase). The distance L is a distance between (center of) the rear wheels 1b of the towing vehicle 1 and the hitch ball 2a of the connector 2 (connection point). In the corresponding formulas, "δ" denotes the steering angle of the towing vehicle 1 and "γc" denotes the jackknife angle θjk.

Next, the jackknife angle θjk and an alarm angle θk will be described. The jackknife angle θjk is calculated for example, by substituting parameters (vehicle specifications) of the towing vehicle 1 and the trailer 3 into a linear geometric relational formula (Formula 1).

In the first embodiment, the front wheels 1a of the towing vehicle 1 are wheels to be steered (i.e. steered wheels). The parameters such as the distances D, W, and L are input from the input portion 28 by using a touch screen function of the monitor device 12 and stored in the memory 25, for example. The jackknife angle θjk is a unique value or eigenvalue (fixed value) for the towing vehicle 1 and the trailer 3. The jackknife angle θjk exists symmetrically at the same angle on both sides of the vehicle longitudinal direction X. The jackknife angle θjk may be calculated by the controller 11. In the first embodiment, the jackknife angle θjk is calculated by the alarm angle calculation portion 15, which is described in detail below. However, the controller 11 may include a dedicated jackknife angle calculation portion. Adjustment (calibration) is performed to correct the formulas if the calculated values differ from values detected by the sensors or from the image due to individual differences or the like.

The alarm angle calculation portion 15 is configured to sequentially calculate the alarm angle θk optimum to the conditions of the towing vehicle 1 and the trailer 3, which change from time to time, by using at least one of the vehicle velocity, acceleration, steering angle of the towing vehicle 1 or the trailer angular velocity ω based on the jackknife angle θjk.

The vehicle velocity is detected by a speed sensor or the like disposed in the towing vehicle 1 and/or the trailer 3. The acceleration is detected by an acceleration sensor or the like disposed in the towing vehicle 1 and/or the trailer 3. The steering angle is a turning angle of the steering wheel of the towing vehicle 1. The steering angle is detected by a steering angle sensor of the towing vehicle 1 or the like. Note that the actual angles of the steered angle and the steering angle different from each other but are treated to have same or similar angles in the first embodiment.

Figure 7:
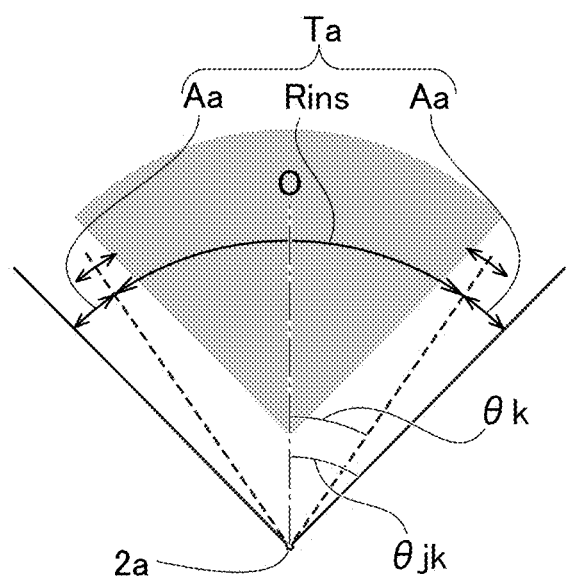
FIG. 7 is a schematic view illustrating relation among a jackknife angle, an alarm angle, and a steering area where the jackknife angle does not occur.

The alarm angle θk is an angle indicating that the trailer angle γ is close to the jackknife angle θjk. As shown in FIG. 7, the alarm angle θk is set inside the jackknife angle θjk so as not to generate the jackknife phenomenon. It is preferable for the alarm angle θk to have a variable value that changes over time in accordance with the conditions of the towing vehicle 1 and the trailer 3 although the alarm angle θk may have a fixed value. The alarm angle θk will be described in detail below.

The allowable steering area Ta, an inner area Rins, and an alert area Aa will be described with reference to FIG. 7. The allowable steering area Ta shown as a sector in FIG. 7 is same as allowable steering area Ta shown in FIG. 3. A reference line O shown by the dotted line in FIG. 7 is on an extension line of the connector 2. The reference line O is a center line that equally divides the allowable steering area Ta in the width direction of the towing vehicle 1. The jackknife angle θjk and the alarm angle θk exist symmetrically across the reference line O, respectively.

In FIG. 7, the sector spreading with an angle doubled by the jackknife angle θjk is the allowable steering area Ta where the jackknife phenomenon does not occur. As shown in FIG. 7, the alarm angle θk is set to be smaller than the jackknife angle θjk. In FIG. 7, the sector spreading with an angle doubled by the alarm angle θk is the inner area Rins. The inner area Rins is a non-jackknife phenomenon area where the jackknife phenomenon does not occur and a non-alert area where an alarm is not generated.

In FIG. 7, an area obtained by subtracting the inner area Rins from the allowable steering area Ta is the alert area Aa just before the jackknife phenomenon occurs.

Next, the alarm angle θk calculated by the alarm angle calculation portion 15 will be described. The alarm angle θk can be obtained, for example, by multiplying the jackknife angle θjk by a gain obtained from the vehicle velocity, the acceleration, the steering angle, the trailer angular velocity ω, or the like. In other words, the value of the alarm angle θk varies in accordance with the conditions of the towing vehicle 1 and the trailer 3.

The alarm angle θk can be obtained by a following formula:

Alarm angle θk=jackknife angle θjk*gain

The gain is formed to be less than one (1). For example, the gain can be obtained by formulas such as "map value/actual value", etc. This formula is formed such that the gain (and alarm angle θk) decreases as the denominator (i.e. actual value) increases while the gain (and alarm angle θk) increases as the numerator (i.e. map value) increases.

Specifically, the formula to calculate the gain is selected from followings:
"map value of vehicle velocity/actual value of vehicle velocity"
"map value of acceleration/actual value of acceleration"
"map value of steering angle/actual value of steering angle"
"map value of trailer angular velocity w/actual value of trailer angular velocity ω"

For example, as FIG. 9, each of the maps has a horizontal axis which represents the current trailer angle γ and a vertical axis which represents the thresholds of the variable physical quantities and is set to be a linear function that increases proportionally. The map value is a value obtained by the map. The map value is obtained as the value (threshold such as trailer velocity threshold, trailer acceleration threshold, steered angle threshold, trailer angular velocity threshold, or the like, for example) of the function at the current trailer angle γ. The gain obtained from each of the physical quantities are, for example, multiplied by each other to obtain a single gain. For example, if the jackknife angle θjk is 30 degrees and the gain is 0.83 . . . , the alarm angle θk is 25 degrees (i.e. 30*0.83 . . . ≈25).

The basic configuration of the towing assist device A described above is mainly adopted to the towing vehicle 1 driven by the driver but may also be adopted to the drive support vehicle and the autonomous vehicle.

The controller 11 may include the steering restriction portion 53 (see FIG. 6). The steering restriction portion 53 is configured to transmit a steerable area restriction signal Ssr to the auto-steering system 22 provided in the towing vehicle 1. The steerable area restriction signal Ssr is a signal for restricting the steerable area of the towing vehicle 1 to be inside the inner area Rins of the alarm angle θk (see FIG. 7).

The steerable area is an area where the steering is allowed and usually located within the maximum steering angles of the towing vehicle 1 at both sides of the reference line O. In the first embodiment, the steerable area during the backward movement is the same as the inner area Rins of the alarm angle θk. However, the steering angle may be automatically restricted so as to be set within an area smaller than the inner area Rins. Thereby, steering or automatic steering that exceeds the alarm angle θk can be prevented.

The steerable area may be configured to restrict the steering angle to an area that does not exceed the jackknife angle θjk (allowable steering area Ta).

Next, the steering by the auto-steering system 22 during the backward movement assistance will be described. In the backward movement assistance for the towing vehicle 1, steering referred to as forward steering, which increases the steering amount, is performed (i.e. steering in an area 64 shown in FIG. 11B). Information on the forward steering is provided from the auto-steering system 22 or the backward movement assist system to the controller 11 via communication, for example.

Figure 11A:
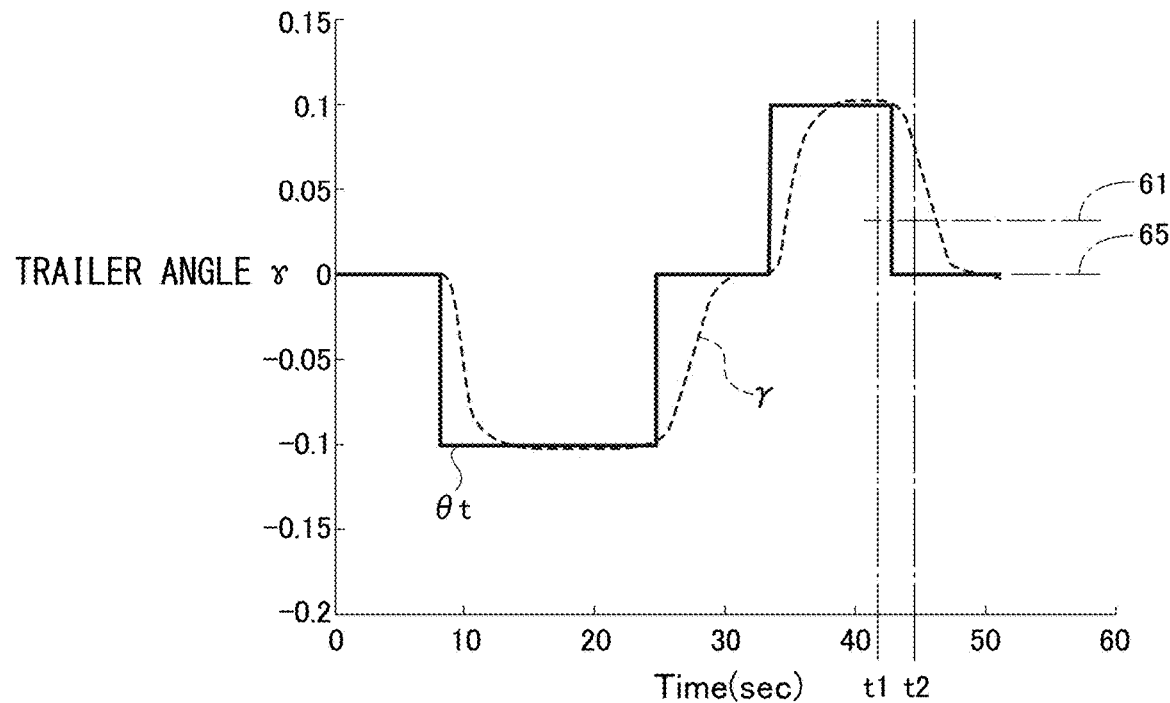
FIG. 11A is a graph showing changes in the trailer angle over time
Figure 11B:
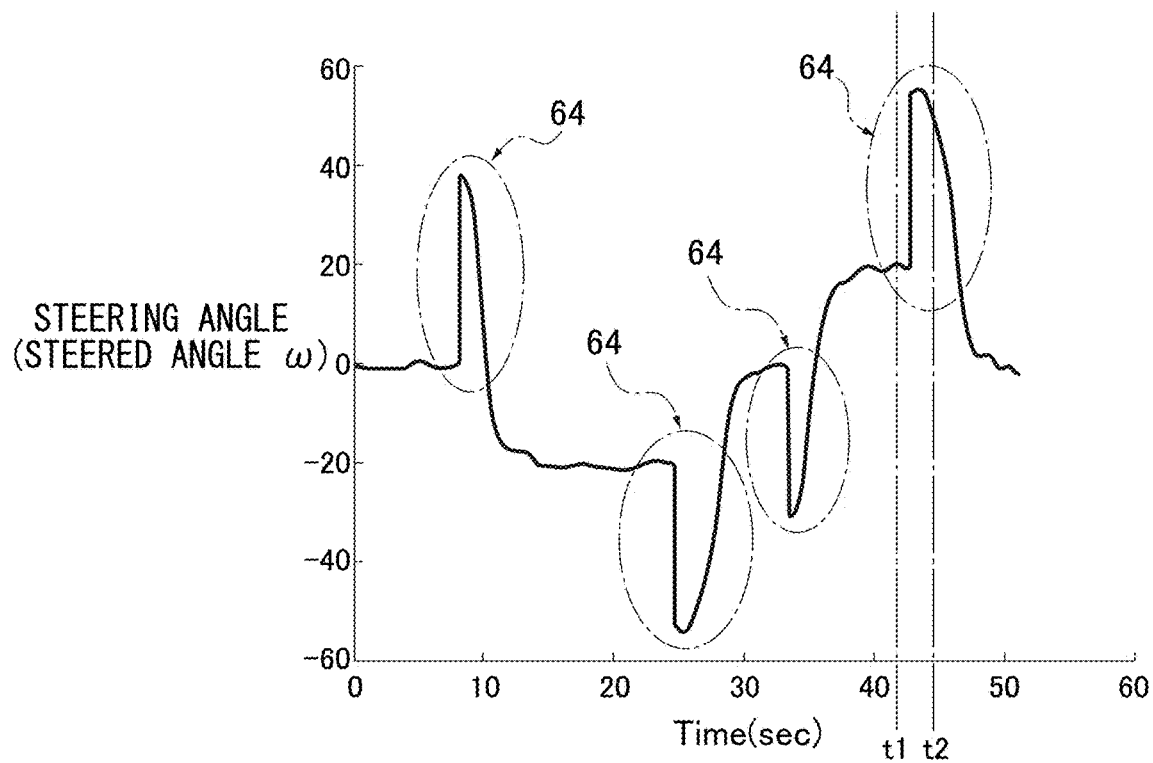
FIG. 11B is a graph showing changes in the steering angle over time.

Specifically, in the backward movement assistance by the auto-steering system 22 or the backward movement assist system, the special steering referred to as the forward steering is performed to change the trailer angle γ faster, for example, when the direction of the trailer angle γ is changed (i.e. when the sign of the trailer angle γ is changed) as shown in FIG. 11A. In the forward steering, the steering is performed to the same direction as the one before the change (i.e. turning it to the same side and then returning it to the other side) as shown in FIG. 11B. The solid line in FIG. 11A shows a target trailer angle θt which is the trailer angle in control and the dashed line shows the actual change in the trailer angle γ. FIG. 11B shows the change in the steering angle to change the trailer angle γ as shown in FIG. 11A. In such a change in the steering angle, the forward steering which is the change of the area 64 is performed relatively frequently.

When the forward steering is performed, the jackknife phenomenon may occur since a large amount of the steering, a sudden change in the steering direction, or the like may cause the significant swing of the trailer 3 or the like. The amount of the steering during the forward steering differs depending on an angle at which the trailer angle γ is changed (target trailer angle θt (FIG. 11A). The target trailer angle θt that changes the trailer angle γ varies in accordance with the conditions of the towing vehicle 1 and the trailer 3 from time to time. In this embodiment, the target trailer angle θt is calculated in accordance with a direction of a swipe by a passenger to a trailer model (towed vehicle model) M3, which is an input to the input portion 28 of the controller 11 via the touch screen 27 or the like.

A steering limit angle is an angle of the trailer 3 set between the current trailer angle γ and the target trailer angle θt to limit or restrict the abrupt change of the trailer angle γ toward the target trailer angle θt (i.e. limit target trailer angle).

Figure 10A:
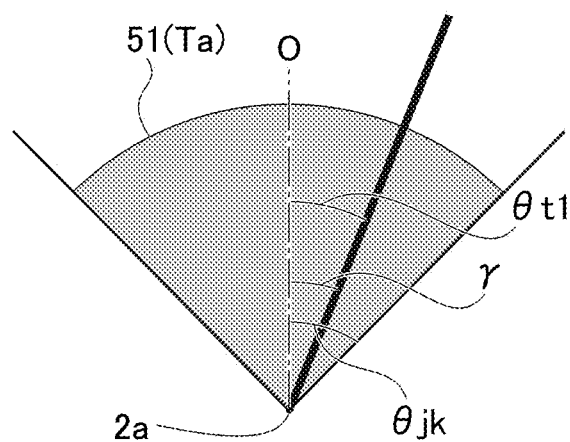
FIG. 10A is an explanatory view illustrating a steerable area before being narrowed.
Figure 10B:
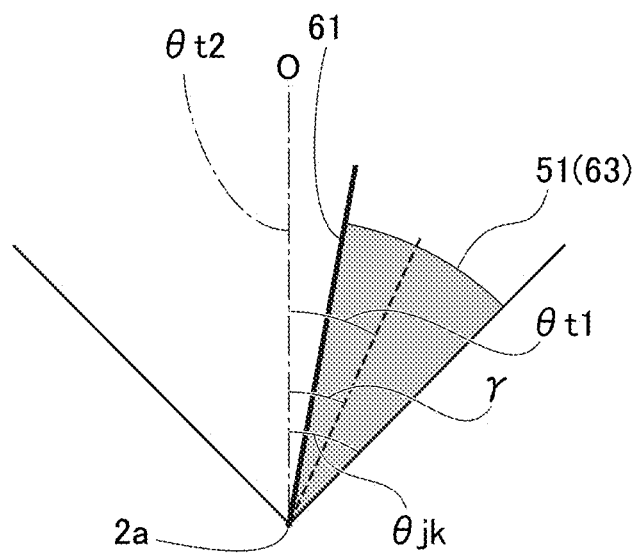
FIG. 10B is an explanatory view illustrating the steerable area that has been narrowed to near a steering limit angle.

Thereby, the steering is allowed only to the steering limit angle. Accordingly, the steerable area 51 for the auto-steering system 22 as shown in FIG. 10A is substantially narrowed to the area (limited area 63 or steerable limited area) defined by the steering limit angle line 61 as shown in FIG. 10B. The steerable area 51, which is symmetrical as shown in FIG. 10A, becomes the limited area 63, which is asymmetrical as shown in FIG. 10B, since a portion of the steerable area 51, which is in the side of the target trailer angle θt, is limited by the steering limit angle. The limited area 63 may be set to be slightly wider (e.g. about 3 to 5 degrees) to the side of the target trailer angle θt than the side of the steering limit angle. It is preferable that the monitor device 12 displays the asymmetrical limited area 63. However, the monitor device 12 may display the steerable area 51 before the limitation of the steering limit by the steering limit angle.

Figure 12A:
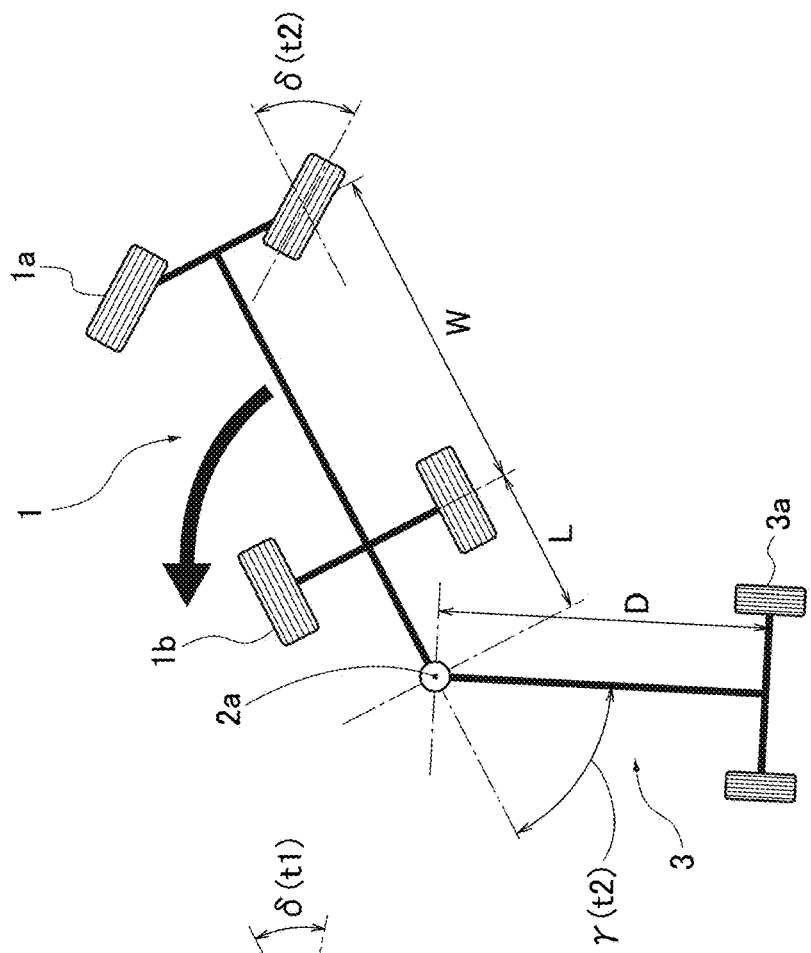
FIG. 12A is a schematic view illustrating a steering condition before forward steering (Time t1)
Figure 12B:
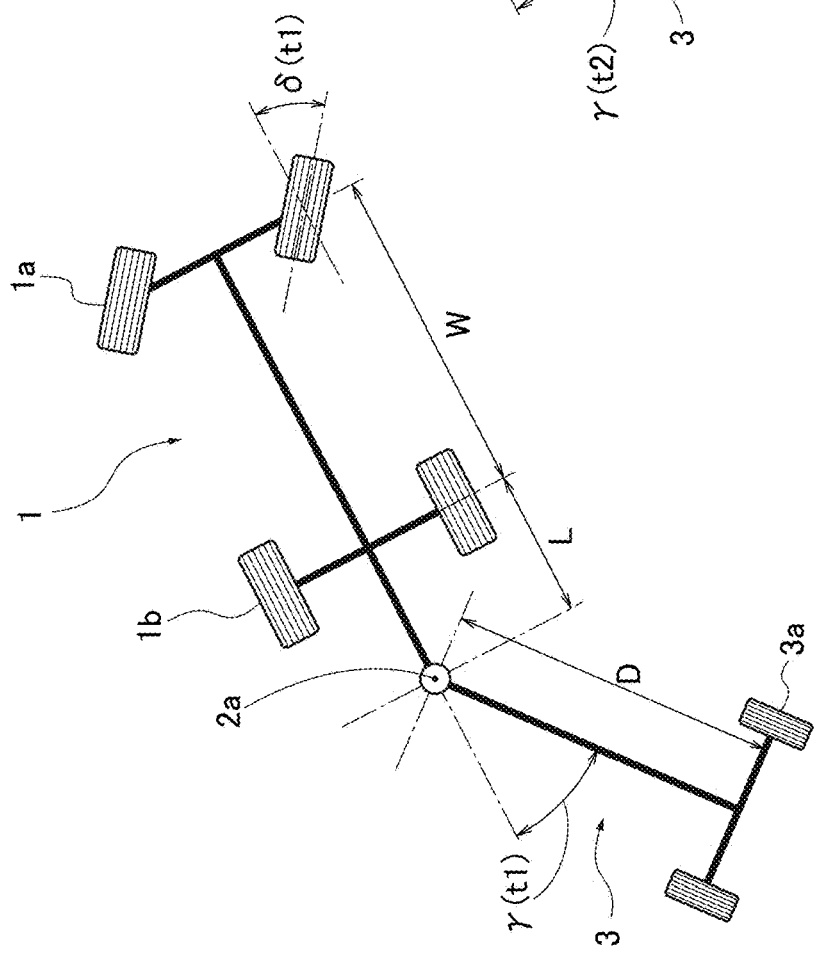
FIG. 12B is a schematic view illustrating the steering condition during the forward steering (Time t2).

FIG. 10A and FIG. 12A correspond to the time t1 (right before forward steering) in the case of the forward steering (area 64) which is finally performed in the graphs of FIGS. 11A and 11B. FIG. 10B and FIG. 12B correspond to the time t2 (in the middle of forward steering) shown in FIGS. 11A and 11B. In the case of forward steering 64 which is finally performed, the target trailer angle θt1 is consistent with the trailer angle γ at the time t1 right before the final forward steering. On the other hand, at the time t2, the target trailer angle θt2 is 0 degree, and the steering limit angle has a value between the target trailer angle θt2 and the trailer angle γ, which is larger than 0 degree. The steering angle δ is largely moved opposite to the target trailer angle θt2 at the time t2 (from δ (t1) to δ (t2)) compared to the time t1.

The specific steering limit angle may be set in any way. For example, the steering limit angle is calculated by the following formula:

Steering limit angle=(jackknife angle θjk−current trailer angle γ)−target trailer angle θt By calculating the steering limit angle using such a formula, the steering limit angle can be kept to a smaller steering amount than the target trailer angle θt. The monitor device 12 may display the steering limit angle, for example, with a red line as well as the narrowed limited area 63 and the area around the connector 2. The steering limit angle line 61 is not limited to the red line. Note that the target trailer angle θt may be displayed or may not be displayed. In the first embodiment, the target trailer angle θt is not displayed unless it is necessary.

The steering limit angle calculation portion 62 is a functional portion of the controller 11 to provide the calculated steering limit angle to the steering restriction portion 53 and limit the steerable area 51 of the towing vehicle 1 within the limited area 63 narrowed by the steering limit angle. The steering restriction portion 53 is a functional portion of the controller 11 to send to the auto-steering system 22 the steerable area restriction signal Ssr for the automatic steering limited within the narrowed limited area 63 by communication with the auto-steering system 22 of the towing vehicle 1.

The provision of the steering limit angle calculation portion 62 and the steering restriction portion 53 enables the towing vehicle 1 to move backward within the limited area 63. In other words, it is possible to move the towing vehicle 1 backward with the moderate steering so that the jackknife phenomenon does not occur even when the forward steering 64 is performed. Note that the backward movement within the limited area 63 may be performed only during the forward steering 64 or may be continuously performed without limiting to during the forward steering 64.

Figure 13:
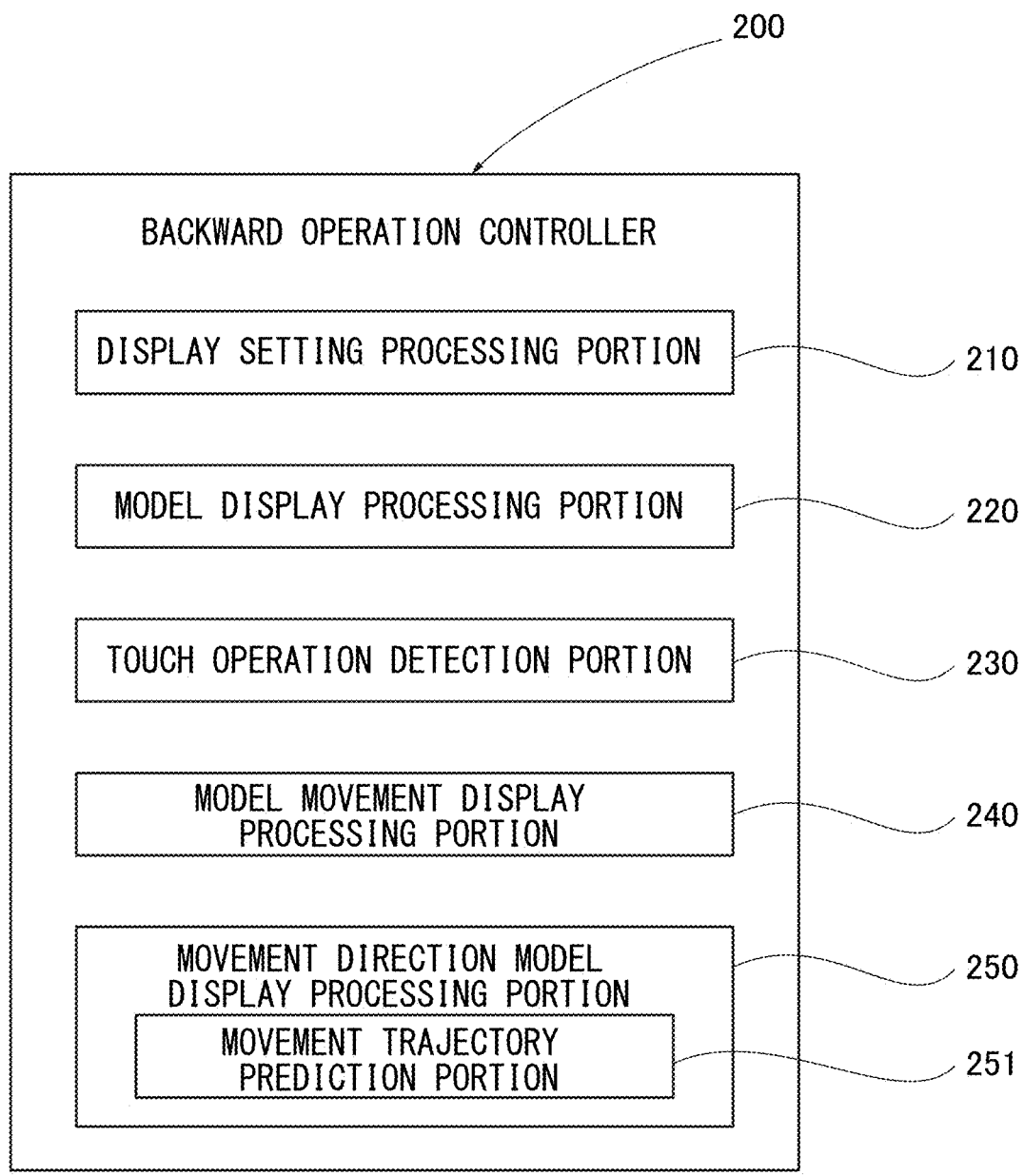
FIG. 13 is a block diagram of a backward movement operation controller.

The assist control during the backward movement has been described. When the vehicle is moved backward, an operator such a driver inputs the movement direction of the trailer 3 via the monitor device 12. Then, the backward movement operation controller 200 of the controller 11 detects the input operation and displays the movement direction of the trailer 3. Hereinafter, the backward movement operation controller 200 will be described. As shown in FIG. 13, the backward movement operation controller 200 includes a display setting processing portion 210, a model display processing portion 220, a touch operation detection portion 230, a model movement display processing portion 240, and a movement direction model display processing portion 250.

The display setting processing portion 210 is configured to divide the display screen 120 into the camera image display portion 121 and an operation image display portion 122 as shown in FIG. 5A. The camera image display portion 121 displays an image obtained by reversing the image captured by the camera 23B in the left and right direction.

The model display processing portion 220 is configured to display an operation image IM on the operation image display portion 122. The operation image IM includes a vehicle model M1, a connector model M2, the trailer model M3, a steering auxiliary line M5, and a trailer model position auxiliary line M6. The vehicle model M1 schematically represents the towing vehicle 1. The connector model M2 schematically represents the connector 2. The trailer model M3 schematically represents the trailer 3. The steering auxiliary line M5 is an arc about the connector model M2. The trailer model position auxiliary line M6 is a line obtained by extending a line that divides the trailer model M3 equally in the vehicle width direction to the connector model M2. The operation image display portion 122 displays the models M1 to M6 viewed from above. Further, the operation image display portion 122 displays the operation image IM so as to the left-right direction of the driver is coincident with the vehicle width direction of the towing vehicle 1. The vehicle model M1 is displayed on the upper side of the operation image display portion 122 and the trailer model M3 is displayed on the bottom side thereof. The model display processing portion 220 displays a steering allowable range display model Mas superimposed on the trailer model M3. The steering allowable range display model Mas will be described below.

The touch operation detection portion 230 detects the operation to the touch screen 27 by the driver (operator) as well as the types and directions of the touch operation. For example, the touch operation includes a tap operation, a swipe operation, and a long press operation. The tap operation is an operation that the user touches the touch screen 27 for a short time and then releases the touch. The swipe operation is an operation that the user touches the touch screen 27 and moves the touched position to an arbitrary position while keeping touching the touch screen 27. The long press operation is an operation that the user keeps touching the touch screen 27 at the same position for a longer time than the tap operation. The touch operation detection portion 230 detects the direction of the trailer 3 to be moved based on the direction to which the touched position is moved by the swipe operation. Specifically, the monitor device 12 includes the touch screen 27, and the driver or the operator inputs the backward movement direction and the angle of the trailer 3 via the touch screen 27 when the towing and towed vehicles are moved backward. This input operation is an operation that the user touches the trailer model M3 with his or her fingertip FT and slides the fingertip FT while touching the trailer model M3 to the direction and the angle the driver wants to move the trailer 3 (i.e. the swipe operation). Then, the touch operation detection portion 230 detects the swipe operation direction which is the operation direction input by the swipe operation and a swipe amount which is the operation amount input by the swipe operation.

The model movement display processing portion 240 is configured to move the trailer model M3 and the trailer model position auxiliary line M6 on the operation image display portion 122 in accordance with the detected swipe operation direction and the swipe amount. As shown in FIGS. 5A to 5E, the movement of the trailer model M3 and the trailer model position auxiliary line M6 on the display is the rotation about a point M2a representing the hitch ball 2a (connection point). Specifically, the swipe operation amount is converted into the rotation angles of the trailer model M3 and the trailer model position auxiliary line M6, and then the trailer model M3 and the trailer model position auxiliary line M6 are rotated to the swipe operation direction on the operation image display portion 122 in accordance with the converted rotation angle. This rotation follows the swipe operation. Only the trailer model M3 may be subject to the movement, and the trailer model position auxiliary line M6 may move in accordance with the movement of the trailer model M3. In other words, the trailer model M3 is moved in response to the touch operation to the trailer model M3 and the trailer model position auxiliary line M6 is moved in accordance with the movement of the trailer model M3 at the same time. This reduces the processing load on the software.

Displaying the trailer model position auxiliary line M6 makes it easier for the operator to grasp the angle of the trailer model M3. Moreover, when the operator operates the trailer model M3, the operator can easily grasp the relation between the operation done by himself or herself (i.e. angle of trailer model M3) and the steering allowable range display model Mas.

The steering allowable range display model Mas described above is displayed as a guide to prevent the angle (target trailer angle γ) at which the trailer model M3 and the trailer model position auxiliary line M6 rotate by the swipe operation from exceeding the jackknife angle θjk. The steering allowable range display model Mas may be set within an area limited by the steering limit angle such as the allowable steering area Ta, the inner area Rins, the limited area 63, the steerable area 51, or the like. In the first embodiment, a range that corresponds to the inner area Rins defined by the alarm angle θk is displayed as the steering allowable range display model Mas. Note that the steering allowable range display model Mas is displayed during the swipe operation shown in FIGS. 5B to 5E. In the case that the inner area Rins is used as the steering allowable range display model Mas, the alarm angle θk that defines the inner area Rins changes in accordance with the movement of the towing vehicle 1. Accordingly, the range (opening angle) of the steering allowable range display model Mas also changes.

Also, the model movement display processing portion 240 limits the rotation amount of the trailer model M3 and the trailer model position auxiliary line M6 that are rotated in response to the swipe operation not to exceed the jackknife angle θjk, i.e. the range of the steering allowable range display model Mas in this embodiment. More specifically, the rotation amount is limited so that the trailer model position auxiliary line M6 does not exceed the steering allowable range display model Mas.

Further, the model movement display processing portion 240 simultaneously calls attention to the passenger such as the driver by color or voice guidance when the swipe operation is performed with the operation amount that the rotation angles of the trailer model M3 and the trailer model position auxiliary line M6 exceed the jackknife angle θjk or the allowable steering area Ta, or the swipe operation is performed exceeding the steering allowable range display model Mas.

The limitation of the trailer model M3 and the trailer model position auxiliary line M6 is not limited to the limitation by the alarm angle θk. The trailer model M3 and the trailer model position auxiliary line M6 may be limited by an angle such as the jackknife angle θjk or the steering limit angle.

The movement direction model display processing portion 250 calculates a predicted movement trajectory of the trailer 3 to achieve the rotation angles of the trailer model M3 and the trailer model position auxiliary line M6 in accordance with the swipe operation amount when the towing vehicle 1 is steered. The calculated predicted movement trajectory is displayed on the camera image display portion 121 as the movement direction display model M4. For example, as shown in FIGS. 5A to 5E, the predicted movement trajectory is displayed in a band shape. The width of the movement direction display model M4 in the band shape is displayed as the width corresponding to the width of the trailer 3.

To this end, the backward movement operation controller 200 further includes a movement trajectory prediction portion 251. The movement trajectory prediction portion 251 is configured to calculate the movement trajectory of the trailer 3 based on the rotation angles of the trailer model M3 and the trailer model position auxiliary line M6 and/or the swipe operation amount. Also, the movement trajectory prediction portion 251 is configured to obtain a steering angle δ for achieving the trailer angle γ by the swipe operation. For example, the trailer angle γ and the steering angle δ can be obtained as the relation between the trailer angle in FIG. 11A and the steering angle in FIG. 11B, and calculated as the movement trajectory when the vehicle moves backward with a predetermined vehicle velocity at the steering angle.

In this case, the relation between the steering angle and the trailer angle γ differs depending on the towed vehicle (difference of distance D shown in FIG. 8, for example). Accordingly, adjustment (calibration) is performed in advance to obtain an optimum value for each of the angles.

Figure 14:
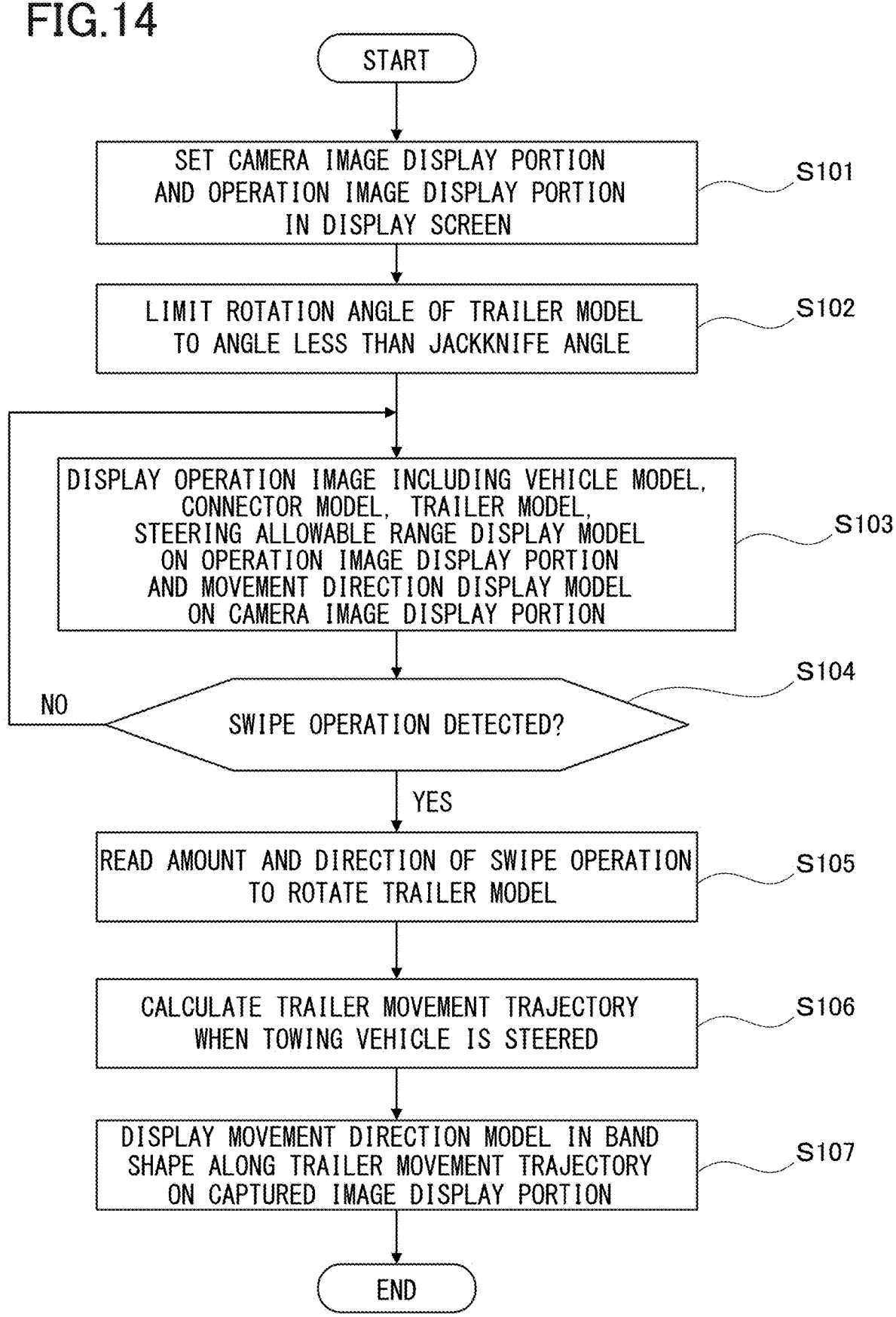
FIG. 14 is a flowchart showing the flow of processes by the backward movement operation controller.

Next, the process flow by the backward movement operation controller 200 when the operator such as the driver inputs the movement direction of the trailer 3 via the monitor device 12 will be described with reference to the flowchart shown in FIG. 14. The process shown in FIG. 14 starts when the operation for the backward movement is selected. For example, the process starts when the instruction to select the backward movement is input via the monitor device 12 or the like or when the shift lever or the gear of the vehicle is moved to a position for the backward movement (i.e. reverse position).

In Step S101, as shown in FIG. 5A, the display setting processing portion 210 divides the display screen 120 into the camera image display portion 121 and the operation image display portion 122. The camera image display portion 121 displays the image captured by the camera 23B. Then, in Step S102, the rotation angle of the trailer model M3 displayed on the monitor device 12 (rotation angle of trailer model position auxiliary line M6) is limited to an angle obtained by doubling the reference angle of the steering allowable range display model Mas. In this embodiment, the rotation angle of the trailer model M3 displayed on the monitor device 12 is limited to the angle 2θk obtained by doubling the alarm angle θk so as to display a range that corresponds to the inner area Rins defined by the alarm angle θk as the steering allowable range display model Mas.

Then, in Step S103, the operation image display portion 122 displays the operation image IM including the vehicle model M1, the connector model M2, the trailer model M3, the steering auxiliary line M5, the trailer model position auxiliary line M6, and the steering allowable range display model Mas. In addition, the camera image display portion 121 displays the movement direction display model M4.

In Step S104, the touch operation detection portion 230 determines whether the swipe operation is detected or not. The determination in Step S104 is repeated until the swipe operation is performed (i.e. NO in S104). The process proceeds to Step S105 when the swipe operation is performed (i.e. YES in S104).

In Step S105, the touch operation detection portion 230 detects and reads the amount and direction of the swipe operation to rotate the trailer model M3 and the trailer model position auxiliary line M6.

In this case, as shown in FIGS. 5A to 5C, when the operator performs the swipe operation to the right direction, the trailer model M3 and the trailer model position auxiliary line M6 are moved to the right direction on the screen in response to the swipe operation by the operator. This operation is to move the trailer 3 backward in the right direction with respect to the towing vehicle 1. The range where the trailer model M3 can be moved by the swipe operation is set within the steering allowable range display model Mas. Thereby, the user can input the instruction regarding the trailer model M3 within the range where the jackknifing phenomenon does not occur without any special consideration.

Figure 5D:
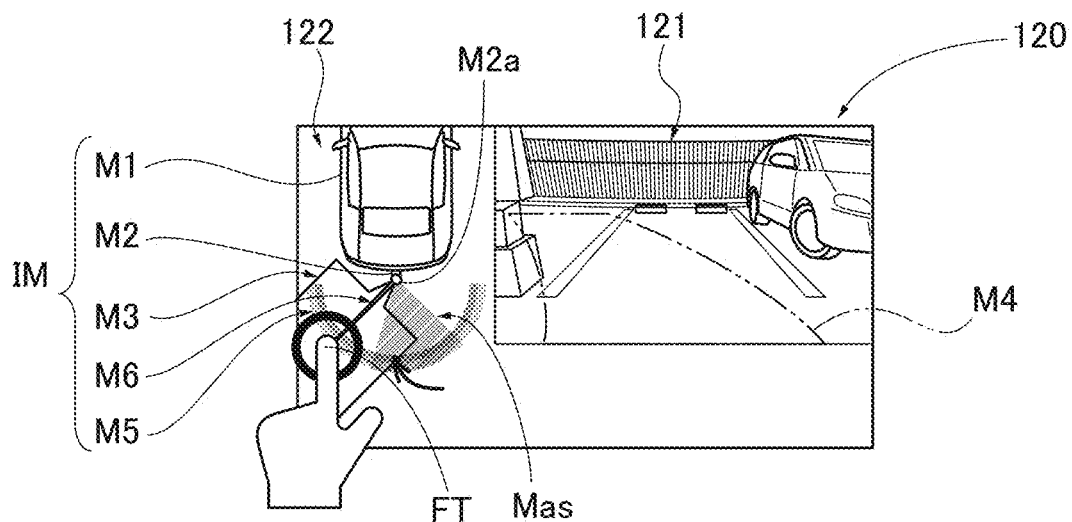
FIG. 5D is a schematic view illustrating the operation image displayed on the operation image display portion in the towing assist device of the first embodiment and the swipe operation wherein the trailer model is swept from the state shown in FIG. 5A in the left direction.
Figure 5E:
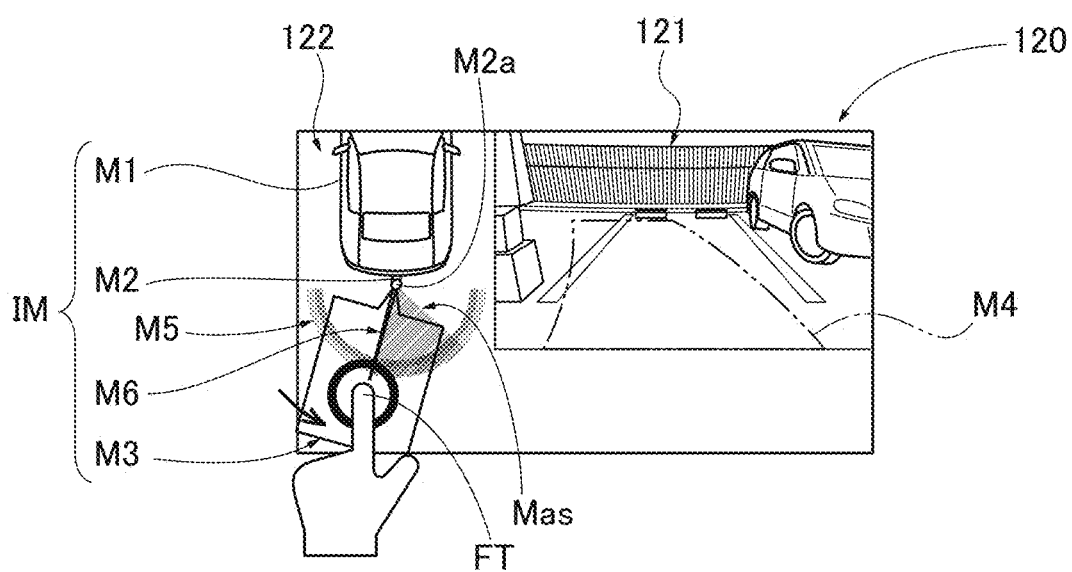
FIG. 5E is a schematic view illustrating the operation image displayed on the operation image display portion in the towing assist device of the first embodiment and the swipe operation wherein the trailer model is swept from the state shown in FIG. 5D in the right direction.

As shown in FIG. 5D, when the operator performs the swipe operation to the left direction, the trailer model M3 is moved to the left direction on the screen in response to the swipe operation by the operator. This operation is to move the trailer 3 backward in the left direction with respect to the towing vehicle 1. As shown in FIG. 5E, when the fingertip FT is returned from a position shown in FIG. 5D to the right direction, the trailer model M3 is also rotated to the right direction from the position shown in FIG. 5D accordingly.

Then, in Step S106, the movement trajectory prediction portion 251 of the movement direction model display processing portion 250 calculates the movement trajectory of the trailer 3 when the towing vehicle 1 is steered in order to achieve the rotation angle of the trailer model M3 in accordance with the swipe operation amount.

Further, in Step S107, the movement direction model display processing portion 250 displays the movement direction display model M4 on the camera image display portion 121 in the band shape. In this case, as shown in FIGS. 5A to 5C, when the trailer model M3 is moved to the right direction with respect to the vehicle model M1, the movement direction display model M4 is displayed on the camera image display portion 121 as being turned or curved to the right direction (see FIGS. 5B and 5C). Specifically, the camera 23B faces the vehicle rear direction but the camera image display portion 121 displays the image by reversing it in the left and right directions. Accordingly, when the trailer 3 is moved to the vehicle right direction, the movement direction display model M4 is also displayed on the display screen 120 as being turned or curved to the right direction. As a result, it is possible to reduce the sense of discomfort with regard to the left-right direction for the driver by displaying it on the camera image display portion 121 in the same direction as a rear-view mirror (not shown).

As shown in FIGS. 5D and 5E, the trailer model M3 is moved to the left direction with respect to the vehicle model M1, the movement direction display model M4 is also displayed on the camera image display portion 121 as being turned or curved to the left direction.

When the user performs the swipe operation further to the left direction from the position shown in FIG. 5E, the positions of the trailer model M3 and the movement direction display model M4 do not change. If the user performs such a swipe operation during the backward movement, the towing vehicle 1 stops. In addition, an alarm is output by display and/or sound, for example, "Swiping further to the left direction causes the jackknife phenomenon. Please swipe the trailer model M3 to the right direction". When the touch position of the user enters within the angle defined by the steering allowable range display model Mas, the movement of the trailer model M3 and the movement direction display model M4 follows the swipe operation again, and the automatic steering resumes in response to the swipe operation by the user.

As can be seen from the comparison between FIG. 5B and FIG. 5C as well as the comparison between FIG. 5D and FIG. 5E, the curve of the movement direction display model M4 becomes larger as the rotation amount of the trailer model M3 becomes relatively larger. The steering auxiliary line M5 may be displayed as shown in FIGS. 5A to 5E. The steering auxiliary line M5 is a scale indicating a certain reference with respect to the steering allowable range display model Mas. The angle of the steering auxiliary line M5 is constant even when the angle of the steering allowable range display model Mas is changed. Thereby, when the conditions of the towing vehicle 1 and the trailer 3 are changed, and accordingly the alarm angle θk and the angle of the steering allowable range display model Mas are changed, the operator can easily understand that the angle of the steering allowable range display model Mas is changed.

As described above, the operator performs the backward movement action of the towing vehicle 1 while inputting the movement direction of the trailer 3. The backward movement action includes stepping on the accelerator, and moving the vehicle backward by creeping without stepping on the accelerator. Instead of the operation of the steering wheel in the conventional vehicle to guide the vehicle to the target direction, the operator of the towing vehicle 1 performs the touch operation to input the movement direction of the trailer 3. The auto-steering system 22 performs the automatic steering to move the towing vehicle 1 backward so that the trailer 3 moves in the direction in accordance with the movement direction of the trailer 3 input via the swipe operation by the operator. When the swipe operation in the direction to change the movement direction of the trailer 3 is detected during the backward movement, the auto-steering system 22 performs the automatic steering in accordance with the newly input direction of the swipe operation to change the direction of the towing vehicle 1 to be moved backward.

Further, the image captured by the camera 23B shown FIGS. 5A to 5E is displayed while the towing vehicle 1 is being moved backward.

As described above, the operator uses the trailer model M3 of the operation image IM to input the direction for the backward movement and performs the swipe operation in the same direction as the direction to which the operator wants to move the trailer 3 with respect to the towing vehicle 1. Thereby, the operator can intuitively input the movement of the trailer 3 with respect to the towing vehicle 1, which improves the operability of the towing assist device A.

In addition, the movement direction of the trailer 3 on the screen is displayed by the movement direction display model M4 on the captured image in the camera image display portion 121 in response to the swipe operation using the trailer model M3. Thereby, the operator can grasp in advance the movement direction and the movement amount of the trailer 3 in accordance with the swipe operation of the trailer model M3 when the trailer 3 moves backward. After starting the backward movement, the movement direction of the trailer 3 on the display screen 120 is coincident with the swipe operation direction and along the movement direction display model M4. In addition, the movement direction of the trailer 3 on the display screen 120 is the same direction as when the driver looks at the rear-view mirror (not shown). These features do not cause the driver to feel uncomfortable.

In particular, as shown in FIGS. 11A and 11B, the rotation direction (steering angle) of the steering wheel by the automatic steering and the movement direction of the trailer 3 (trailer angle γ) are not coincident with each other in the towing vehicle 1. Also, the movement direction of the trailer 3 with respect to the towing vehicle 1 and the movement of the trailer 3 on the display screen 120, when the captured image by the camera 23B is displayed as it is, are reversed. The above movement may cause the driver to feel uncomfortable. On the other hand, according to the first embodiment of the present disclosure, the operator such as the driver can grasp the movement of the trailer 3 with respect to the towing vehicle 1 on the display screen 120 and the movement on the captured image on the display screen 120 in advance as described above. Moreover, the captured image by the camera 23B is displayed on the display screen 120 by reversing it in the left and right directions. Accordingly, it is possible to prevent the occurrence of discomfort described above.

(1) The towing assist device A in the first embodiment includes the camera (imaging device) 23B, the monitor device 12, and the controller 11. The camera 23B photographs or captures the rearward area from the trailer 3 when the towing vehicle 1 to which the trailer 3 is connected by the connector 2 moves backward. The monitor device 12 includes the display screen 120 that displays the images captured by the camera 23B and the touch screen 27 that detects the contact position to the display screen 120. The controller 11 is connected to the camera 23B and the monitor device 12. The controller 11 is configured to control the display of the monitor device 12 as the backward movement assistance while the towing vehicle 1 is moving backward.

Further, the controller 11 includes the display setting processing portion 210, the model display processing portion 220, the touch operation detection portion 230, the model movement display processing portion 240 as the towed vehicle model movement display processing portion, and the movement direction model display processing portion 250.

The display setting processing portion 210 is configured to set the camera image display portion 121 that displays the captured image and the operation image display portion 122 that displays the operation image IM on the display screen 120. The model display processing portion 220 displays the vehicle model M1 representing the towing vehicle 1, and the trailer model M3 as the towed vehicle model representing the trailer 3 on the operation image display portion 122. The touch operation detection portion 230 is configured to detect the touch operation that moves the trailer model M3 displayed on the operation image display portion 122 of the display screen 120. The model movement display processing portion 240 is configured to move the trailer model M3 on the operation image display portion 122 in response to the touch operation. The movement direction model display processing portion 250 is configured to obtain the movement direction of the trailer 3 on the captured image when the trailer 3 is to be moved with respect to the towing vehicle 1 in accordance with the touch operation direction and to display the captured image and the movement direction display model M4 that represents the movement direction of the trailer 3 on the captured image. Further, the automatic steering is performed to move the towing vehicle 1 backward in response to the touch operation to the trailer model M3.

Thereby, the operator such as the driver can input the movement of the trailer 3 with respect to the towing vehicle 1, which improves the operability of the towing assist device A. In addition, the movement direction model display processing portion 250 displays the movement direction of the trailer 3 on the captured image on the display screen 120 of the monitor device 12 by the movement direction display model M4 on the display screen 120 in response to the swipe operation using the trailer model M3. Thereby, the operator such as the driver can grasp the relation between the operation direction and the movement direction of the trailer 3 on the display screen 120 before moving the trailer 3. Therefore, it is easy for the operator to accurately grasp the movement direction of the trailer 3 even if the monitor device 12 (the display screen 120) is arranged in the driver's seat or outside the vehicle, for example. Moreover, the operator can move the trailer 3 backward in the intended direction only by instructing the direction of the trailer 3 via the touch operation to the trailer model M3 without performing the complicated steering for the towing vehicle 1.

(2) The towing assist device A of the first embodiment includes the movement trajectory prediction portion 251 that is configured to obtain the predicted movement trajectory of the trailer 3 when the towing vehicle 1 is steered to move backward in response to the swipe operation. Then, the movement direction model display processing portion 250 displays the predicted movement trajectory in a band shape as the movement direction display model M4 superimposed on the captured image.

Thereby, in addition to the movement direction of the trailer 3 on the display screen 120, the operator such as the driver can grasp the trajectory the trailer 3 follows when moving backward in advance so that interference between the trailer 3 and objects can be prevented.

(3) The model display processing portion 220 of the towing assist device A in the first embodiment displays the vehicle model M1 representing the towing vehicle 1 and the trailer model M3 representing the trailer 3 as viewed from above. Accordingly, the operator such as the driver can intuitively recognize the actual movement direction of the trailer 3 with respect to the towing vehicle 1, which improves the operability of the towing assist device A.

(4) The model movement display processing portion 240 of the towing assist device A in the first embodiment moves and displays the vehicle model M1 as a rotation movement about the hitch ball 2a as the connection point by the connector 2 in response to the touch operation.

Thereby, the operator such as the driver can easily visually recognize the trailer angle γ with respect to the towing vehicle 1 during the backward movement operation, which improves the operability of the towing assist device A.

(5) The controller 11 of the towing assist device A in the first embodiment includes the alarm angle calculation portion 15 as the jackknife angle calculation portion that calculates the jackknife angle θjk at which the towing vehicle 1 and the trailer 3 cause the jackknife phenomenon during the backward movement. Further, the model movement display processing portion 240 limits the movement amount of the trailer model M3 to the range that does not exceed the jackknife angle θjk.

The operator such as the driver may operate too much without knowing how to appropriately perform the swipe operation to rotate the trailer model M3. However, the above limitation according to this embodiment prevents the steering that causes the jackknife phenomenon, which improves operability of the towing assist device A.

(6) The controller 11 of the towing assist device A in the first embodiment calculates, based on the jackknife angle, the alarm angle θk as the trailer angle at which the jackknife phenomenon does not occur. In addition, the model display processing portion 220 displays the steering allowable range display model Mas superimposed on the trailer model M3 of the operation image display portion 122. The steering allowable range display model Mas represents the range of the alert area Aa that indicates the area of the trailer angle γ at which the jackknife phenomenon does not occur.

Thereby, the operator can visually grasp in advance the operable limit range when performing the swipe operation, which improves the operability of the towing assist device A compared to the case that the steering allowable range display model Mas is not displayed.

(7) In the towing assist device A of the first embodiment, the display screen 120 and the controller 11 are provided in the vehicle, and the display screen 120 is provided in front of a driver's seat in a longitudinal direction of the towing vehicle 1 to face rearward in the longitudinal direction thereof.

In such an arrangement of the display screen 120, when the image from the camera 23B is displayed as it is, the actual left and right movement direction of the trailer 3 with respect to the towing vehicle 1 and the left and right movement direction of the trailer 3 on the display screen 120 are reversed during the backward movement. Therefore, the operator such as the driver may be confused as to which direction the trailer 3 is moving in the left or right when watching the display screen 120. Even in such a situation, according to the present embodiment, the operability of the towing assist device A can be improved as described in the section (1). Further, it is possible for the operator such as the driver to accurately grasp the direction to which the trailer 3 is moved as well as the movement direction of the trailer 3 on the display screen 120. Moreover, in the first embodiment, the backward movement operation controller 200 displays the captured image by the camera 23B on the camera image display portion 121 of the display screen 120 by reversing it in the left and right direction. Thereby, the left and right direction of the image on the camera image display portion 121 and the left and right direction of the image in the rearview mirror (not shown) are coincident with each other, which reduces the discomfort for the driver and further prevents the above-mentioned confusion.

Other Embodiments

Hereinafter, other embodiments of the towing assist device according to the present disclosure will be described. In the other embodiments, only elements different from those in the first embodiment will be described while the elements common to those in the first embodiment are labelled with the same reference numbers used in the first embodiments and the descriptions of the same elements are omitted.

Second Embodiment

Figure 15:
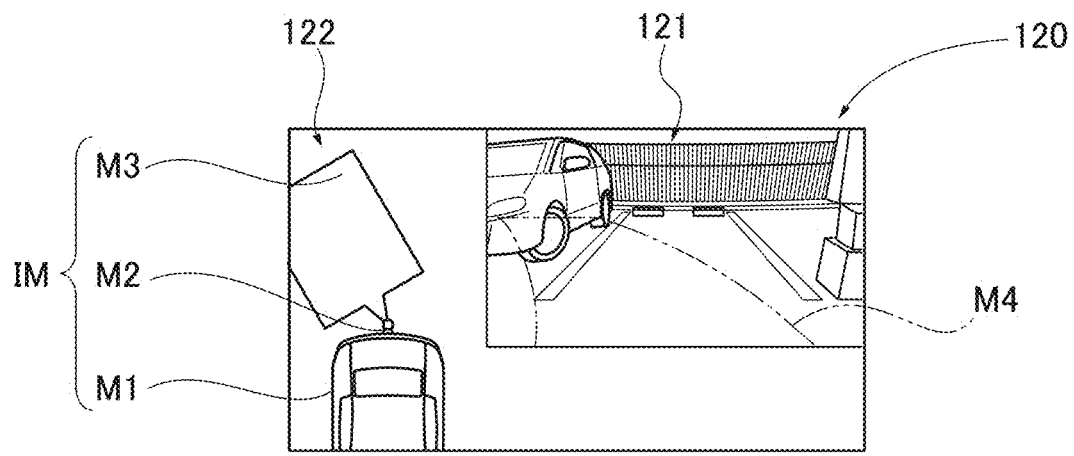
FIG. 15 is a schematic view illustrating an operation image displayed on an operation image display portion in a towing assist device of a second embodiment.

As shown in FIG. 15, a towing assist device in the second embodiment includes the vehicle model M1, the connector model M2, and the trailer model M3. The vehicle model M1, the connector model M2, and the trailer model M3 on the operation image display portion 122 of this embodiment are arranged upside down from those of the first embodiment. In this case, even if the camera image display portion 121 displays the image from the camera 23B as it is, the movement direction of the trailer model M3 when the movement direction is input is coincident with the movement direction indicated by the movement direction display model M4 on the camera image display portion 121. Accordingly, the operator such as the driver does not feel discomfort with regard to the image of the movement direction of the trailer 3 on the camera image display portion 121. Also, according to the second embodiment, an effect similar to one in the first embodiment can be achieved.

Third Embodiment

Figure 16:
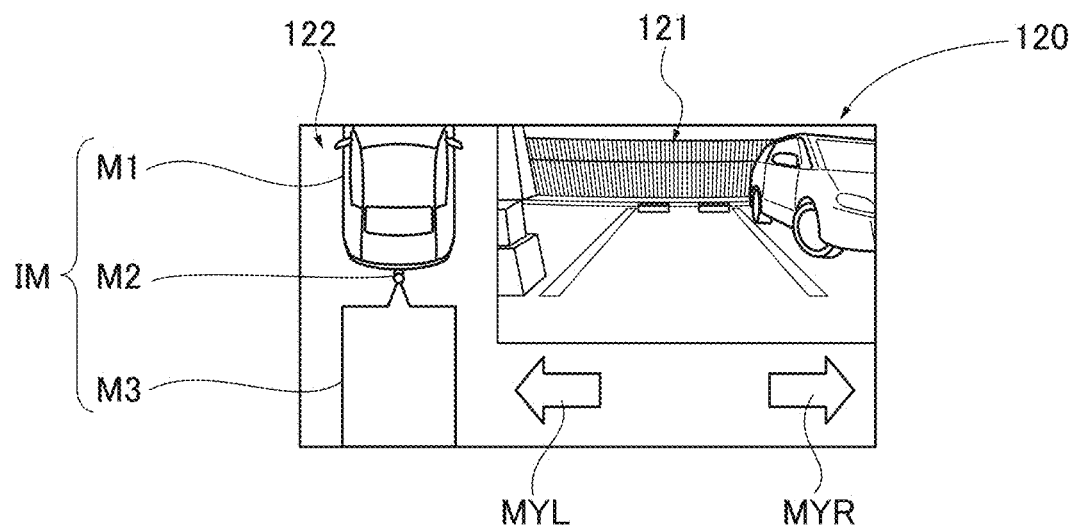
FIG. 16 is a schematic view illustrating an operation image displayed on an operation image display portion in a towing assist device of a third embodiment.

As shown in FIG. 16, in a towing assist device according to the third embodiment, the movement direction model display processing portion 250 displays, as the movement direction display model M4, arrow models MYL and MYR that indicate the left and right directions, respectively. In the third embodiment, the touch operation detection portion 230 detects the swipe operation to the trailer model M3. For example, the arrow model MYR is highlighted when the trailer model M3 is swiped in the right direction. On the other hand, the arrow model MYL is highlighted when the trailer model M3 is swiped in the left direction. For example, the highlight of the models includes flashing the model to be highlighted, changing the colors of the model to be highlighted, changing the size of the model to be highlighted, and the like.

Also, the arrow models MYL and MYR may be used as the operation image IM. In this case, the touch operation detection portion 230 detects the swipe operation, the tap operation, or the long press operation to the arrow models MYL and MYR. In the case of the tap operation, it is sufficient that the touch operation detection portion 230 at least detects which of the arrow models MYL and MYR is tapped. The movement direction model display processing portion 250 displays the movement direction of the trailer 3 with the arrow models MYL and MYR on the display screen 120 in accordance with the tap operation. For example, the trailer 3 may be moved by a single tap operation. In this case, the trailer 3 is moved to the left direction when the arrow model MYL is tapped, while the trailer 3 is moved to the right direction when the arrow model MYR is tapped. For example, in the case that the long press operation is performed on the arrow model MYL or the arrow model MYR, the trailer 3 may be moved while the long press operation is being detected. In this case, the trailer 3 is moved to the left direction when the arrow model MYL is pressed long, while the trailer 3 is moved to the right direction when the arrow model MYR is pressed long.

In the case of the swipe operation, it is sufficient that at least the swipe operation direction is detected. Then, the movement direction model display processing portion 250 displays the movement direction of the trailer 3 with the arrow models MYL and MYR on the display screen 120 in accordance with the swipe operation. In this case, in order to indicate the movement direction of the trailer 3, one of the arrow models MYL and MYL that is coincident with the movement direction of the trailer 3 may be displayed, or the arrow model that is coincident with the movement direction of the trailer 3 is flashed or colored while the arrow models MYL and MYL are being displayed as shown in FIG. 16, for example. In the case that the arrow models MYL and MYR are used as the operation image IM, the movement direction display model M4 may be displayed.

Also, according to the third embodiment, an effect similar to one in the first embodiment can be achieved.

Fourth Embodiment

Figure 17:
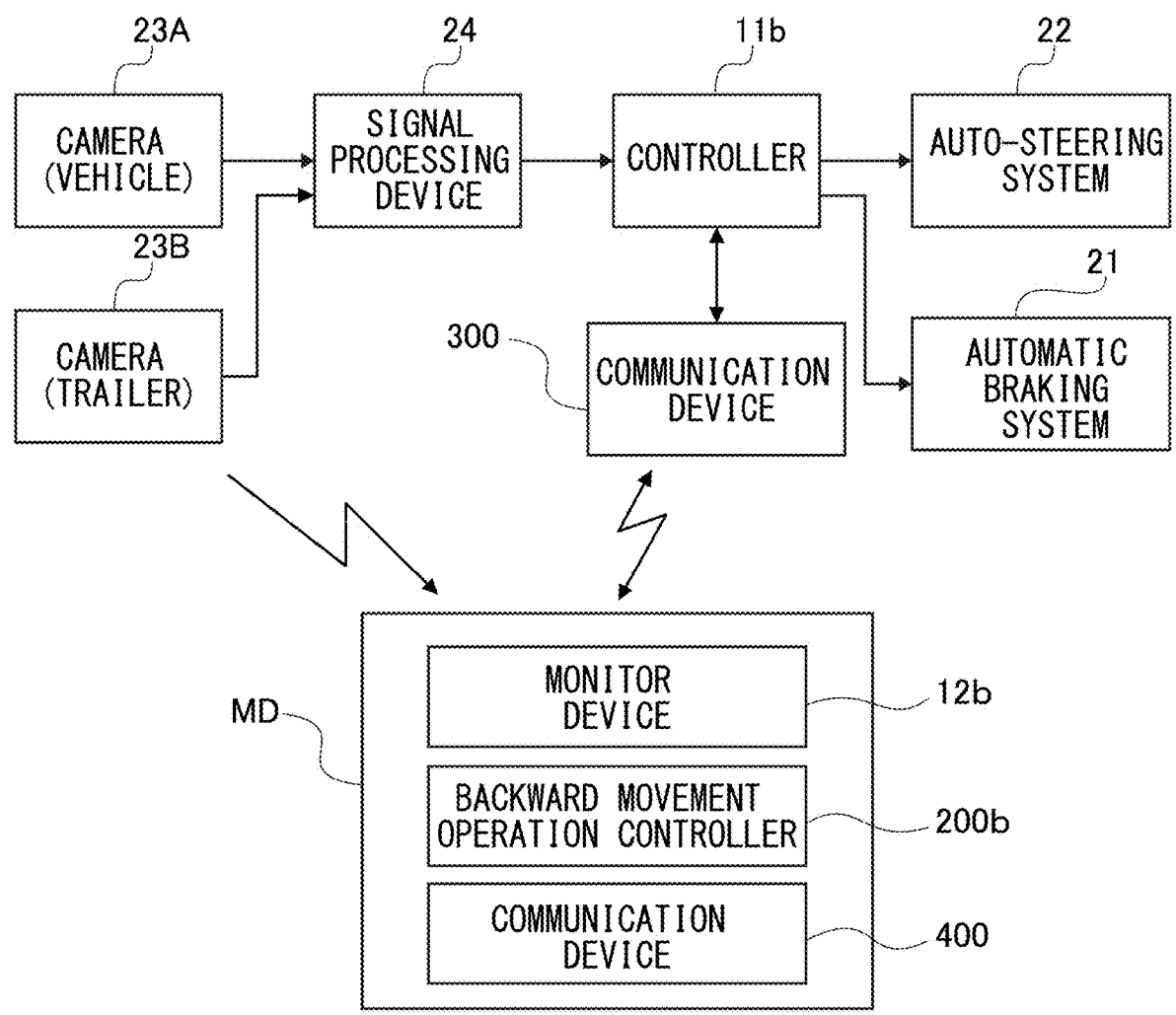
FIG. 17 is a schematic block diagram of a towing assist device of a fourth embodiment.

In a towing assist device according to the fourth embodiment, the monitor device 12 and the controller 11 can be taken out from the towing vehicle 1. In other words, as shown in FIG. 17, the monitor device 12*b* and a backward movement operation controller 200*b* are provided in a mobile device MD as a remote control device outside the vehicle. The monitor device 12*b* and the backward movement operation controller 200*b* of this embodiment perform similar functions as the monitor device 12 and the backward movement operation controller 200*b* of the first embodiment via installed applications. For example, the mobile device MD may be a portable or mobile computer, a mobile phone, a smartphone, or the like.

The mobile device MD includes a communication device 400 that bidirectionally communicates with an in-vehicle communication device 300. The communication between the communication device 300 and the communication device 400 may be direct communication or communication via a communication network. In addition, the images captured by the camera 23B may be transmitted via the controller 11*b* and the communication device 300. Also, the images may be transmitted wirelessly from the camera 23B to the mobile device MD (via Wi-Fi etc., for example).

With the configuration above, the operator can perform the operations outside the vehicle. In this case, the operator watches the display screen 120 of the monitor device 12*b* outside the vehicle. As a result, it is difficult to relate the movement direction of the trailer 3 on the display screen 120 to the actual movement direction. On the other hand, according to this embodiment, the operator can grasp the operation direction and the movement direction of the trailer 3 on the display screen 120 in advance by the operation image IM displayed on the camera image display portion 121 of the display screen 120 and the movement direction display model M on the operation image display portion 122. Accordingly, as described in the first embodiment, high operability can be achieved regardless of the direction in which the monitor device 12 faces the towing vehicle 1, and the operator such as the driver can accurately grasp the relation between the operation direction and the movement direction of the trailer 3 on the display screen 120.

Note that in the case that the mobile device MD is operated outside the vehicle, the model display processing portion 220 may include a device for detecting the relative position of the mobile device MD with respect to the towing vehicle 1, and the positional relation between the vehicle model M1 and the trailer model M3 of the operation image IM may be set according to the relative position between the towing vehicle 1 and the trailer 3 viewed from a location where the mobile device MD is located.

Although the embodiments of the present disclosure have been described with reference to the figures, the specific configurations are not limited to ones in the embodiments. Modifications, changes of the designs, the configurations, the structures, and additions thereto are allowed as long as they do not depart from the gist of the inventions recited in the claims.

For example, the automatic steering and the automatic braking during the backward movement are described in the above embodiments, but the present disclosure is not limited thereto. The present disclosure may be adopted to the vehicle which the driver manually moves backward. In this case, it is effective to know the movement direction of the trailer 3 on the display screen 120 in advance since the driver moves the vehicle backward while watching the display screen 120.

Further, in the above embodiments, the rotation amount of the trailer model M3 is limited during the swipe operation and the steering allowable range display model Mas that indicates the rotatable amount is displayed, but the present disclosure is not limited thereto. For example, at least one of the limitation of the rotation amount and the display of the steering allowable range display model Mas may be performed, or neither of them may be performed. Also, in this case, the alarm generator 18 triggers an alarm when the steering that may cause the jackknife phenomenon is performed. Accordingly, the jackknife phenomenon can be prevented. Although the models M1, M2 and M3 are schematically represented in the above embodiments, the present disclosure is not limited thereto and the actual images of the towing vehicle and the trailer may be displayed. Further, in the case that the models M1 to M3 are schematically represented, the shapes of the models are not limited to ones shown in the figures in the above embodiments. Other shapes may be used as long as the user can recognize the towing vehicle and the towed vehicle.

In the above embodiments, the automobile is exemplified as the towing vehicle and the trailer is exemplified as the towed vehicle. However, the towing vehicle and the towed vehicle are not limited thereto. For example, the present disclosure may be adopted to full trailer type trucks, articulated buses, or the like.

Note that the above embodiments are only examples of the present disclosure. The embodiments may be modified and/or applied without departing from the spirit of the present disclosure.

The block diagrams illustrating the functional elements, which are referenced herein, illustrate by classifying the functional elements based on the main processes thereof so that the present disclosure can be easily understood. The elements may be further classified into more elements depending on the processes of the elements. The elements may also be classified so that each of the elements performs more processes.

What is claimed is:

1. A towing assist device, comprising:
    an imaging device that is configured to capture a rear area from a towed vehicle when a towing vehicle moves backward, the towed vehicle being connected to the towing vehicle via a connector;
    a monitor device that comprises a display screen configured to display a captured image which is captured by the imaging device, and a touch screen function for detecting a touch position to the display screen; and
    a controller that is connected to the imaging device and the monitor device, the controller being configured to control a display of the monitor device when the towing vehicle moves backward;
    wherein the controller comprises:
    a display setting processing portion that is configured to set on the display screen, a captured image display portion that displays the captured image and an operation image display portion that displays an operation image;
    a model display processing portion that is configured to display a towing vehicle model that represents the towing vehicle and a towed vehicle model that represents the towed vehicle on the operation image display portion;
    a touch operation detection portion that is configured to detect a touch operation that moves the towed vehicle model displayed on the operation image display portion of the display screen; and
    a movement direction model display processing portion that is configured to obtain a movement direction and a rotational angle of the towed vehicle in accordance with a direction and an angle of the touch operation to the towed vehicle model, the touch operation being an operation to input the direction and the angle to move the towed vehicle backward while touching of the towed vehicle model is maintained,
    wherein the movement direction model display processing portion is further configured to display, on the captured image display portion, the captured image and a movement direction display model that represents the movement direction of the towed vehicle on the captured image in accordance with the movement direction and the rotational angle of the towed vehicle.

2. The towing assist device according to claim 1, further comprising:
    a movement trajectory prediction portion that is configured to obtain a predicted movement trajectory of the towed vehicle when the towing vehicle is steered and moved backward in response to the touch operation,
    wherein the imaging device is configured to be mounted on a rear portion of the towed vehicle and the captured image shows the rear area from the towed vehicle, and
    wherein the movement direction model display processing portion is configured to display the predicted movement trajectory of the towed vehicle in a band shape as the movement direction display model superimposed on the captured image at the rear area of the towed vehicle.

3. The towing assist device according to claim 1, wherein the movement direction model display processing portion is configured to display arrows that represent left and right movement directions of the towed vehicle as the movement direction display model on the captured image display portion.

4. The towing assist device according to claim 1, wherein the model display processing portion is configured to display the towing vehicle model and the towed vehicle model, the towing vehicle model being an overhead view of the towing vehicle viewed from above and the towed vehicle model being an overhead view of the towed vehicle viewed from above.

5. The towing assist device according to claim 1, wherein the controller further comprises a towed vehicle model movement display processing portion that is configured to move and display the towed vehicle model as a rotation movement about a connection point of the connector in response to the touch operation.

6. The towing assist device according to claim 1, wherein the controller further comprises:
    a jackknife angle calculation portion that is configured to calculate a jackknife angle at which the towing vehicle and the towed vehicle cause a jackknife phenomenon during a backward movement thereof; and
    a towed vehicle model movement display processing portion that is configured to limit a movement amount of the towed vehicle model by the touch operation to a range that does not exceed the jackknife angle.

7. The towing assist device according to claim 6,
    wherein the controller is configured to calculate, based on the jackknife angle, a trailer angle at which the jackknife phenomenon does not occur, and
    wherein the model display processing portion is configured to display a steering allowable range display model superimposed on the towed vehicle model of the operation image display portion, the steering allowable range display model representing an area of the trailer angle at which the jackknife phenomenon does not occur.

8. The towing assist device according to claim 1, wherein the display screen and the controller are remote control devices configured to communicate with the towing vehicle from outside the towing vehicle.

9. The towing assist device according to claim 1,
    wherein the model display processing portion is further configured to rotate the towed vehicle model about a connection point of the towing vehicle model and the towed vehicle model in accordance with the direction and the angle of the touch operation relative to the towed vehicle model, and
    wherein the movement direction model display processing portion is further configured to move the movement direction display model in accordance with the movement direction and the rotational angle of the towed vehicle.

10. A towing assist system comprising:
a towing vehicle; and
a towing assist device,
wherein the towing assist device comprises:
an imaging device that is configured to capture a rear area from a towed vehicle when the towing vehicle moves backward, the towed vehicle being connected to the towing vehicle via a connector;
a monitor device that comprises: (i) a display screen disposed in the towing vehicle in front of a driver's seat in a longitudinal direction of the towing vehicle so as to face rearward in the longitudinal direction of the towing vehicle, and configured to display a captured image which is captured by the imaging device; and (ii) a touch screen function for detecting a touch position to the display screen; and
a controller that is disposed in the towing vehicle and connected to the imaging device and the monitor device, the controller being configured to control a display of the monitor device when the towing vehicle moves backward;
wherein the controller comprises:
a display setting processing portion that is configured to set, on the display screen, a captured image display portion that displays the captured image and an operation image display portion that displays an operation image;
a model display processing portion that is configured to display a towing vehicle model that represents the towing vehicle and a towed vehicle model that represents the towed vehicle on the operation image display portion;
a touch operation detection portion that is configured to detect a touch operation that moves the towed vehicle model displayed on the operation image display portion of the display screen; and
a movement direction model display processing portion that is configured to obtain a movement direction and a rotational angle of the towed vehicle in accordance with a direction and an angle of the touch operation to the towed vehicle model, the touch operation being an operation to input the direction and the angle to move the towed vehicle backward while touching of the towed vehicle model is maintained,
wherein the movement direction model display processing portion is further configured to display, on the captured image display portion, the captured image and a movement direction display model that represents the movement direction of the towed vehicle on the captured image in accordance with the movement direction and the rotational angle of the towed vehicle.

11. A towing assist system comprising:
a towed vehicle;
a towing vehicle; and
a towing assist device,
wherein the towing assist device comprises:
an imaging device that is configured to capture a rear area from the towed vehicle when the towing vehicle moves backward, the towed vehicle being connected to the towing vehicle via a connector;
a monitor device that comprises a display screen configured to display a captured image which is captured by the imaging device, and a touch screen function for detecting a touch position to the display screen; and
a controller that is connected to the imaging device and the monitor device, the controller being configured to control a display of the monitor device when the towing vehicle moves backward;
wherein the controller comprises:
a display setting processing portion that is configured to set, on the display screen, a captured image display portion that displays the captured image and an operation image display portion that displays an operation image;
a model display processing portion that is configured to display a towing vehicle model that represents the towing vehicle and a towed vehicle model that represents the towed vehicle on the operation image display portion;
a touch operation detection portion that is configured to detect a touch operation that moves the towed vehicle model displayed on the operation image display portion of the display screen; and
a movement direction model display processing portion that is configured to obtain a movement direction and a rotational angle of the towed vehicle in accordance with a direction and an angle of the touch operation to the towed vehicle model, the touch operation being an operation to input the direction and the angle to move the towed vehicle backward while touching of the towed vehicle model is maintained,
wherein the movement direction model display processing portion is further configured to display, on the captured image display portion, the captured image and a movement direction display model that represents the movement direction of the towed vehicle on the captured image in accordance with the movement direction and the rotational angle of the towed vehicle.

12. The towing assist system according to claim 11, wherein the towing assist device further comprises a movement trajectory prediction portion that is configured to obtain a predicted movement trajectory of the towed vehicle when the towing vehicle is steered and moved backward in response to the touch operation,
wherein the imaging device is mounted on a rear portion of the towed vehicle and the captured image shows the rear area from the towed vehicle, and
wherein the movement direction model display processing portion is configured to display the predicted movement trajectory of the towed vehicle in a band shape as the movement direction display model superimposed on the captured image at the rear area of the towed vehicle.

13. The towing assist system according to claim 11, wherein the display screen and the controller are disposed in the towing vehicle, and
wherein the display screen is disposed in front of a driver's seat in a longitudinal direction of the towing vehicle so as to face rearward in the longitudinal direction of the towing vehicle.

14. The towing assist system according to claim 11, wherein the display screen and the controller are remote control devices that are disposed outside the towing vehicle and configured to communicate with the towing vehicle.

* * * * *